United States Patent [19]

Makris et al.

[11] Patent Number: 4,979,100

[45] Date of Patent: Dec. 18, 1990

[54] COMMUNICATION PROCESSOR FOR A PACKET-SWITCHED NETWORK

[75] Inventors: Perry Makris, Fairfax; Frederick Choi, Herndon; Mark Klimek, Centreville; James Mapp; Koji Munemoto, both of Herndon; Jeff Nicoll, Chantilly; Mark Soderberg, Sterling; James A. Moore, Fairfax, all of Va.

[73] Assignee: Sprint International Communications Corp., Reston, Va.

[21] Appl. No.: 176,654

[22] Filed: Apr. 1, 1988

[51] Int. Cl.[5] .............................................. G06F 1/00
[52] U.S. Cl. .............................. 364/200; 364/228.3; 364/222.2; 364/242.6; 364/242.8
[58] Field of Search ............... 370/85.6, 85.7, 85.8, 370/79; 364/200 MS File, 900 MS File

[56] References Cited

U.S. PATENT DOCUMENTS

| | | | |
|---|---|---|---|
| 4,593,282 | 6/1986 | Acampora et al. | 370/79 |
| 4,608,685 | 8/1986 | Jain et al. | 370/85.8 |
| 4,651,316 | 3/1987 | Kocan et al. | 370/85.7 |
| 4,654,655 | 3/1987 | Kowalski | 370/85.6 |
| 4,654,845 | 3/1987 | Mukerji | 370/85.6 |
| 4,807,116 | 2/1989 | Katzman et al. | 364/200 |

Primary Examiner—Raulfe B. Zache
Attorney, Agent, or Firm—Leitner, Greene & Christensen

[57] ABSTRACT

A packet switch receives data and processes it for assembly into packages. A bus allows communication between each of the data processing units of the switch and one or more storage units for storing the data packets. Arbitration for deciding which of the processing units will be granted access to the bus is performed by a system which selectively and alterably designates any of at least two different levels of priority of access to the bus for each of the processing units, and the relative percentages of time of access for the different priorty levels. The system assures greater access to the bus by those of the processing units having the higher level of priority. If communication is provided by two buses, the requests for access are alternated between them. The arbitration system provides selective access to the bus in any of a plurality of bus cycles including a read cycle, a write cycle and a read/modify/write cycle, and grants a request for access from a higher priority processing unit within one bus cycle.

28 Claims, 22 Drawing Sheets

COMMUNICATION PROCESSOR FOR A PACKET-SWITCHED NETWORK

FIELD OF THE INVENTION

The present invention relates generally to packet-switched networks, and more particularly to an improved communication processor, or packet switch, for such networks.

BACKGROUND OF THE INVENTION

In packet-switched networks, packets in the form of blocks of data are transmitted from a source—such as a user terminal, computer, application program within a computer, or other data handling or data communication device—to a destination, which may be simply another data handling or data communication device of the same character. The devices themselves typically are referred to as users, in the context of the network. Packet switching arose, in part, to fulfill the need for low cost data communications in networks developed to allow access to host computers. Special purpose computers designated as communication processors have been developed to offload the communication handling tasks which were formerly required of the host. The communication processor is adapted to interface with the host and to route packets along the network; consequently, such a processor is often simply called a packet switch.

Packet-switched data transmission may be accomplished via predetermined end-to-end paths through the network, in which user packets associated with a great number of users share link and switch facilities as the packets travel over the network. Accordingly, the packets require storage at nodes between transmission links of the network until they may be forwarded along the respective outgoing link for the overall path. This type of data transmission is generally referred to as virtual circuit or connection-oriented transmission.

Another mode of packet-switched data transmission requires no initial connection for a data path through the network, and, hence, is termed connectionless transmission. In this mode, individual datagrams carrying a destination address are routed through the network from source to destination via intermediate nodes, and do not necessarily arrive in the order in which they were transmitted.

By way of example, in the widely-used Telenet public packet-switched network the routing of data is accomplished using a two-level hierarchy. The hierarchy comprises a long distance-spanning backbone network with a multiplicity of hubs or nodes, each of which utilizes a cluster of backbone switches; and smaller geographic area networks with backbone trunks, access lines and clustered lower level switches connected to each hub. Packet-switched data transmission through the network is accomplished by means of the virtual circuit connection-oriented mode using CCITT (International Telegraph and Telephone Consultative Committee of the International Telecommunications Union) X.75 protocol, which is a compatible enhancement of X.25 protocol.

X.25 is an interface organized as a three-layered architecture for connecting data terminals, computers, and other user systems or devices, generally referred to as data terminal equipment (DTE), to a packet-switched network through data circuit terminating equipment (DCE) utilized to control the DTE's access to the network. The three layers of the X.25 interface architecture are the physical level, the frame level and the packet level. Although data communication between DCEs of the network is routinely handled by the network operator typically using techniques other than X.25, communication between the individual user system and the respective DCE with which it interfaces to the network is governed by the X.25 or similar protocol. In essence, X.25 establishes procedures for congestion control among users, as well as call setup (or connect) and call clearing (or disconnect) for individual users, handling of errors, and various other packet transmission services within the DTE-DCE interface.

The X.75 protocol used in the Telenet network features the same call set up and packet handling procedures as X.25, with various enhancements including higher bit rates (56 kbps) at the physical level, extended sequence numbering at the frame level, and additional utility field for call setup packets at the packet level. A special multilink protocol governs handling of established virtual circuits with respect to load sharing and recovery from link failures. In the event of failure of a trunk group or transmit hub, a reconnect procedure is required to reestablish a transmission path. Each call is initiated by a user-transmitted call-request packet. It is noteworthy that the Telenet public packet-switched network employs the X.75 protocol for routing the call-request packet through the entire backbone network via an appropriate route, rather than merely as an interface between DTEs and DCEs or between networks. Acknowledging acceptance of calls, call clearance, and certain other functions are provided using other X.25 control packets.

Prospective routing paths in the Telenet network are initially determined by a network control center, which then transmits these predetermined paths to the backbone switches as routing tables consisting of primary and secondary choices of available links from each hub. The secondary choices are viable only in the event of primary link failures, and the specific secondary link selection is a local decision at the respective hub based principally on current or recent traffic congestion patterns. The unavailability of an outgoing link from a hub at the time of the call setup effects a clearing back of the predetermined virtual circuit for the sought call to the preceding hub. An alternative link is then selected by that hub, or, if none is available there, the virtual circuit is again cleared back to the next preceding hub, and so forth, until an available path is uncovered from the routing tables. Messages concerning link and/or hub failures are communicated immediately to the network control center, and that information is dispatched to the rest of the network by the center.

The switches used in the Telenet public network and various of its private networks are members of the multiprocessor TP4000 (sometimes referred to in abbreviated fashion as TP4) packet switch family. The basic switch includes line processing units (LPUs) for overseeing the lines to the DTEs, whether terminals, hosts or otherwise, and the network trunks (at the X.25 frame level), and a central processing unit (CPU) for routing at the packet level. The CPU, using a stored table of trunk-to-trunk active virtual circuits, maps the identity of the access-seeking LPU, its line number and the associated logical channel relative to the outgoing counterparts, for an identified virtual circuit at the respective hub.

The present generation (prior art) TP4000 packet switch (or communication processor) has been designated as the TP4000/II. Referring now to FIG. 1, the basic configuration of the TP4000/II includes a main memory unit 10, an arbitrator unit (ARB) 12, a CPU 15, and a plurality of LPUs 17-1 through 17-$n$ coupled and vying for access to either of a pair of demand assign buses (DABs) 20A and 20B. Access for packet transmissions is controlled by ARB 12. Connected to each LPU 17 is an associated interface unit 22 to which a respective input port, for example modem 25, is connected. The interface unit converts to external signal levels (RS232, etc.), on data entering the interface from each modem. From that point onward through the switch, everything is in the converted level until a level conversion is performed back to the original format by an interface 22 associated with a respective LPU 17-x upon subsequent re-transmission of the data from the switch.

A typical LPU I7 of the type used in the TP4000/II packet switch of FIG. i is shown in block diagrammatic form in FIG. 2. The LPU has serial interface ports or serial interface controllers constituting serial input/output ports (SIOs) 27 which are connected to the interface 22. Data from the modem is subjected to level conversion by the interface card 22 prior to entry into the LPU. It should be mentioned that references from time to time herein to a card or cards is merely in recognition that the particular unit being described is embodied in a printed circuit card and the various electronic components mounted and interconnected thereon. The level-converted data then proceeds into an applicable channel of the LPU. Each LPU may handle eight ports, for example, and because one-to-one mapping is used, the associated interface would also handle eight ports. The SIO units convert the incoming data from serial to parallel format, and handle some of the very low level protocols, such as checking for errors, and the like.

After the data conversion from serial to 8-bit parallel format, a direct memory access (DMA) controller 30 of the LPU performs a move function by which blocks of data are moved from one particular location to another particular location. Accordingly, the 8-bit parallel data is read out by the DMA controller 30 and the blocks of data are thereby transferred out on one of the two DAB buses 20 (A or B) and into a particular location in the main memory 10 (FIG. 1). The DMA controller controls all eight ports in a perfunctory manner, being programmed by a 6502 processor 32 to store the information for each channel in a particular location in the main memory by movement in blocks of data. The 6502 processor utilizes local random access memory (RAM) 84 and read-only memory (ROM) 35 in carrying out its functions. A redundant DAB interface 87 is provided to the pair of DAB buses 20 A and B to accommodate movement of the blocks of data onto either bus in the event of a failure on the other bus.

Referring again to FIG the arbitrator unit 12, main memory unit 10 and backplane bus 20 of the TP4000/II packet switch are an integral unit. The arbitrator controls access to the bus, but since there is essentiallY only one bus (in view of the redundancy feature) to the main memory, the process may be viewed as an arbitration for access to main memory rather than an arbitration for access to the bus. The integral unit constitutes a single resource with redundant memory, redundant arbitrator and redundant bus (that is, backup for each), in which switching to the backup unit is performed in the event of a failure of the arbitrator, the main memory or the bus.

Once data is transferred into the main memory 10, CPU 15 monitors that data and the intercard (i.e., LPUs and other units of the switch) communication areas, to determine where the data should now be transferred. The CPU then notifies an appropriate LPU that particular data in the main memory is to be transferred to that LPU. Accordingly, the path of data is via a modem through an LPU, with arbitration onto the bus and into main memory. Then a processing decision is made by the CPU as to the intra-switch destination for the data, and the CPU thereupon notifies the other card (the LPU), whereupon the data is transferred out of main memory through the selected LPU, its associated interface, and out through that modem or port. This is the manner in which the TP4000/II switch performs its packet switching. The packetizing (i.e., packet assembly) is accomplished in the LPU. Asynchronous data is received, packets are formed, and the packets are subsequently switched throughout the network until, at the other end, the packet is disassembled and transferred as asynchronous data again.

The TP4000/II arbitration protocol on the DAB bus treats CPUs separately from LPUs. A block diagram useful for describing the protocol is shown in FIG. 3. The LPUs 40-1, 40-2, 40-$n$ compete for access to the bus, in order to have their respective data packets (if any) read into the main memory. The competition is arbitrated by ARB unit 42 in a daisy chain approach by which the ARB initially passes a token to the LPU 40-1. If that LPU is ready to use the bus, it will hold the token and the bus, and on completion of its use will pass the token to the next LPU in the chain. If at that point LPU 40-2 has no need for access to the bus, it will simply pass the token to the next LPU. Finally, the last LPU in the chain, 40-$n$, passes the token back to the ARB 42. The scheme is such that the holder of the token holds possession of the bus. A separate token is employed for the CPUs 45-1 and 45-2, and here again a daisy chain approach is employed for the arbitration. If the CPUs are not using their bus time, the LPUs may use it.

With this protocol, there may be passage of considerable time for the token to travel between units before the unit presently desiring to use the bus is encountered. That is, if LPU 40-1, for example, initially receives the token and has no present need to use the bus, the token is passed from LPU to LPU, When perhaps only LPU 40-15 is in need of access. Viewing the bus protocol of FIG. 3 in terms of clock cycles, a CPU or an LPU will remain idle and waiting until the token is passed to it—indeed, the unit may sit and wait until the token passes through a considerable number of LPUs until it finally gets the token—despite the fact that it may be the only card that is seeking to transfer data and, therefore, that requires the bus.

Hence, time, and as a result, valuable bandwidth may be wasted as the token is passed from card to card until a need to use the bus is found. Moreover, as previously noted, at least some of the units within the packet switch, such as the LPUs, are individually configured on respective printed circuit cards. These cards are inserted into designated slots in cages within a console. The bus protocol requires that a ribbon cable be run between cages, with an attendant further slowing of the bus.

Although an LPU may gain control of the bus, it is essential to the retention of control that a response (acknowledgment) must be delivered to indicate that the message was received. The response is pipelined at fixed intervals; that is to say, the LPU monitors for the acknowledgment at a particular clock cycle by counting clock cycles, and if the acknowledgment is not received at the point when it should have returned, this is an indication that a problem has arisen.

Many other prior art packet switches (i.e., besides the TP4000/II) use the same or similar bus protocols. For example, one bus type employs multiple bus request chains, with separate predetermined priorities, each chain employing an arbitration scheme corresponding to that described above. Another form of prior art packet switch uses a slightly different scheme, in that whenever a unit has need for access to the bus, that unit must transmit a particular pattern onto the arbitration bus. Hence, many units may be driving the arbitration bus at the same time. Periodically, the driving units read the patterns and make a decision as to whether to remain a requester or to abandon the request, based on the apparent priorities of other requesters, until a winner is declared. The process may take several clock cycles before the determination of a winner is made.

Each of these other prior art arbitration schemes suffers disadvantages corresponding to those of the aforementioned TP4000/II, namely, that time and bandwidth are wasted as a consequence of the nature of the selection process for an appropriate bus user.

It is a principal object of the present invention to provide an improved packet switch.

A more specific object of the invention is to provide a packet switch, or communication processor, utilizing an improved arbitration scheme that allows any data processor (e.g, packet assembler/disassembler (PAD), CPU, and so forth) to request the bus immediately upon need for access and to have that need assessed within a brief time interval such a single clock cycle.

A further object of the present invention is to provide an improved packet switch in which bus grants are issued within a relatively short time after the respective bus requests are made.

Still another object of the present invention is to provide a packet switch with improved bandwidth utilization.

A further object of the present invention is to provide a packet switch capable of handling a substantially larger number of ports than has heretofore been permissible with prior art packet switches.

The task of achieving a new and improved packet switch requires performance improvements worthy of the cost and time necessary for the effort, together with economic reductions in the cost of manufacture and upkeep, and in the consumption of power; while simultaneously retaining at least some of the significant and desirable aspects and features of the prior art switch on which the improved packet switch is based. In the specific instance of improvement of the multi-processor-based TP4000 packet switch class from the present generation /II to the next generation /III level, it was deemed essential to maintain very nearly the same software architecture, with the attendant necessity that hardware architecture at the upper levels would retain a degree of similarity. Furthermore, it was important that the hardware improvements to be implemented would allow the software to be run faster and more efficiently. Retention of a substantial part of the existing software was deemed desirable in view of a well-recognized rule against simultaneously changing hardware and software, and by an existing substantial investment in the software employed for the Telenet common carrier network and that used for related private networks.

SUMMARY OF THE INVENTION

According to the present invention, a communication processor for a packet-switched network employs a bus protocol by which individual PADS or other processing units seeking access to a bus for communication with another utilization device (e.g., a memory, another PAD, a CPU, etc ) are assigned to different priority groups according to specific need, which may be determined for example from data traffic patterns. The priority groupings are programmable so that they are selectively alterable in the event of changed conditions, such as changed traffic patterns. Furthermore, the communication processor may be programmed to selectively establish the percentage of time that the higher priority level access-seeking devices are to be granted access relative to the access to be accorded to devices at the lower priority levels.

In a presently preferred embodiment, the utilization devices are designated as either master or slave modules, or both. A master module may initiate a bus cycle to access a slave, to transfer data between itself and the slave. A slave module has only the capability to respond to a request from a master to perform a particular bus cycle. Three types of bus cycles may be executed on the central bus system, consisting of read, write, and read/-modify/write cycles, each cycle consisting of a request phase and a response phase. The bus system and the arbitration protocol are such that a requesting module (a master) will only drive the bus for one clock cycle, assuring a response to the access request within that cycle, and thereby enhancing the bus throughput by freeing the bus for other requesters.

Accordingly, it is still another object of the present invention to provide a packet switch or communication processor in which utilization devices for transferring data among one another within the switch, are designated as master or slave units according to their respective capability to access one or more buses for the purpose of effecting such data transfer between or among each other, and wherein a request for access to the bus may be received and responded to within one bus clock cycle.

The presently preferred embodiment further includes at least one bus arbitrator adapted to implement a programmable algorithm which in part permits the assignment of selected levels of priority for access to the bus among the master modules, so that some of the master modules possess a higher priority to obtain such access than others of the master modules. Moreover, where two buses are available, the algorithm permits programming to alternate the requests for access between or among the two buses, so that the load may be shared between them.

Therefore, it is yet another object of the present invention to provide a packet switch satisfying the immediately preceding object, and in which the master units may be assigned selectively alterable levels of priority for access to the bus, and further, wherein if more than a single bus is provided, the requests for access by the master units are selectively alternated among the buses.

Features of the invention include a central bus system, an interface for the central bus system, a packet transfer bus, an arbitrator implementing an arbitration algorithm, and a media access controller [all to be expanded on].

BRIEF DESCRIPTION OF THE DRAWINGS

The above and still further objects, features, aspects and attendant advantages of the present invention will become apparent from a consideration of the following detailed description of a presently preferred embodiment thereof, taken in conjunction with the accompanying drawings, in which.

DETAILED DESCRIPTION OF THE PREFERRED EMBODIMENT

A. System Overview

Figure 1:
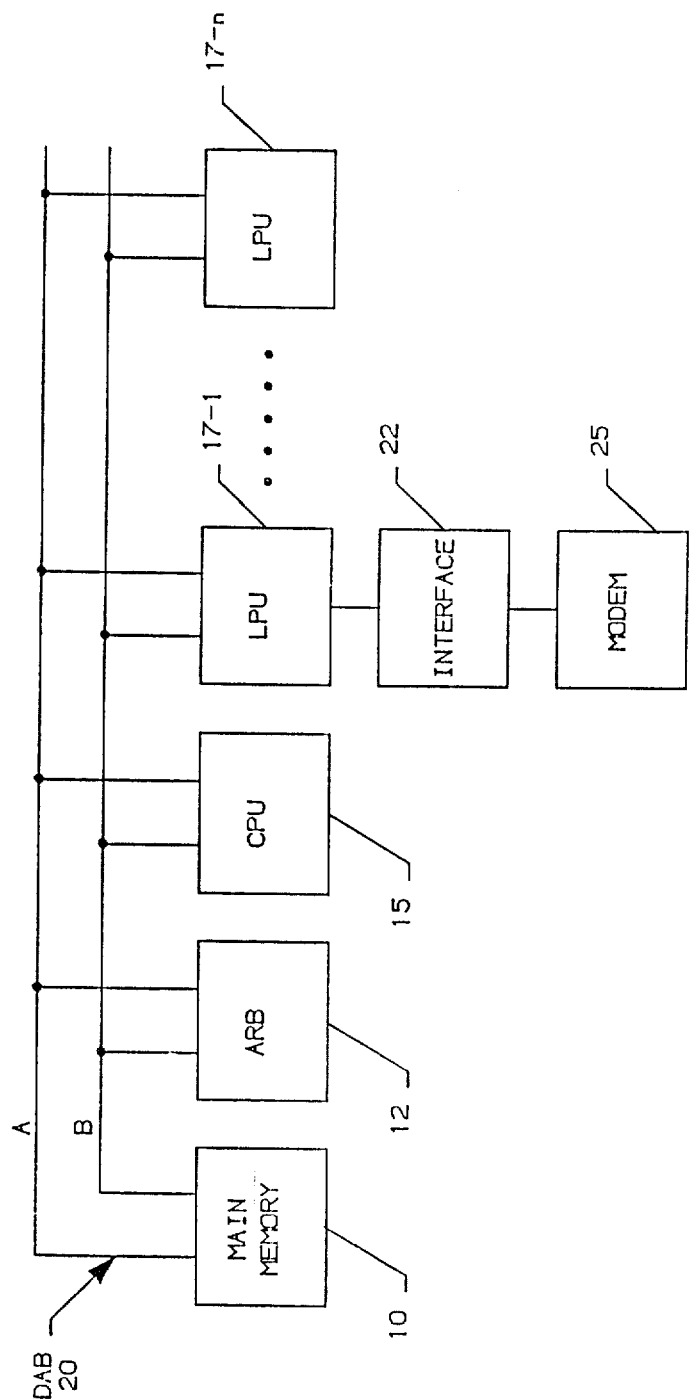
FIGS. 1, 2 and 3, discussed above, relate to structural aspects and the bus protocol for the prior art TP4000/II communication processor.

The packet switch to be described herein is a member of the multiprocessor system TP4000 family, and will be referred to from time to time by the designation TP4000/III The principal improvements of the latter over the predecessor TP4000/II switch reside in increased throughput, availability and reliability, in a lower cost hardware system. The multiprocessor system comprising the hardware architecture of the TP4000/III switch is based on the Motorola Semiconductor MC68020 32-bit microprocessor, and is compatible with existing TP4000 software architecture. The system modularity and homogeneity permit the structuring of individual Packet Switching Units (PSUs) accommodating from as few as 100 ports to more than 512 ports.

Before providing an overview of the system operation by reference to a set of simplified block diagrams, it will be helpful to touch briefly on the system hardware and to provide definitions and acronyms for some of the terminology which will be used throughout the overview and the detailed description to follow.

The switch system hardware is divided into two major subsystems, referred to as the Switch Facility (SF) and the Transmission Facility (TF). The Switch Facility provides X.25 level 3 switching and link level control, system administration, and call setup and clearing. It contains a Common Control Element Cage (CCE-Cage), Line Processing Module Cage (LPM-Cage), and Central Bus System (CBS). Both types of cages are adapted, in the presently preferred embodiment, to house and provide connections for up to twenty printed circuit cards/modules with separate installation slots. The CCE-Cage contains Common Processing Modules (CPMs), including Central Processing Units (CPUs), Shared Storage Units (SSUs), and Bus Arbitrators (ARBs). The LPM-Cage contains Line Processing Modules (LPMs), and ARBs.

The minimum SF configuration has one CCE-Cage containing both the CPMs and the LPMs, while the maximum switch facility has one CCE-Cage and one LPM-Cage. The CBS interconnects all of the modules within the SF. It consists of an intracage bus at the backplane of each CCE-Cage and LPM-cage, Which provides the communication path between the modules (cards) contained in each cage; and an intercage bus which provides the communication path between cages within the SF. Data communications from one card to another card in the same cage are termed "intracage" transfers, whereas data transfers between cards in different cages constitute "intercage" transfers. Each CCE-Cage and LPM-Cage contains two ARBs (in the redundant configuration) to coordinate intracage and intercage bus requests.

The Transmission Facility provides media access control, including frame-level processing, signal conversion and physical connections, and contains Protocol Control Units (PCUs) and Level Converters (LCs). Packet Transfer Buses (PTBs) provide parallel data paths between the SF and the TF to interconnect one LPM in the former with up to four PCUs in the latter, for communication therebetween. Each LPM and its associated PCUs are referred to as a Line Processing Unit (LPU). The PCUs also communicate with two LCs within the TF via a Level Converter Modem interchange (LCM) bus. Each LC has two independent LCM bus interfaces, one of which connects to an active LPU and the other of which connects to a standby LPU of the same type. A single LPU may be configured to provide redundancy for all LPUs of the same type.

Figure 4:
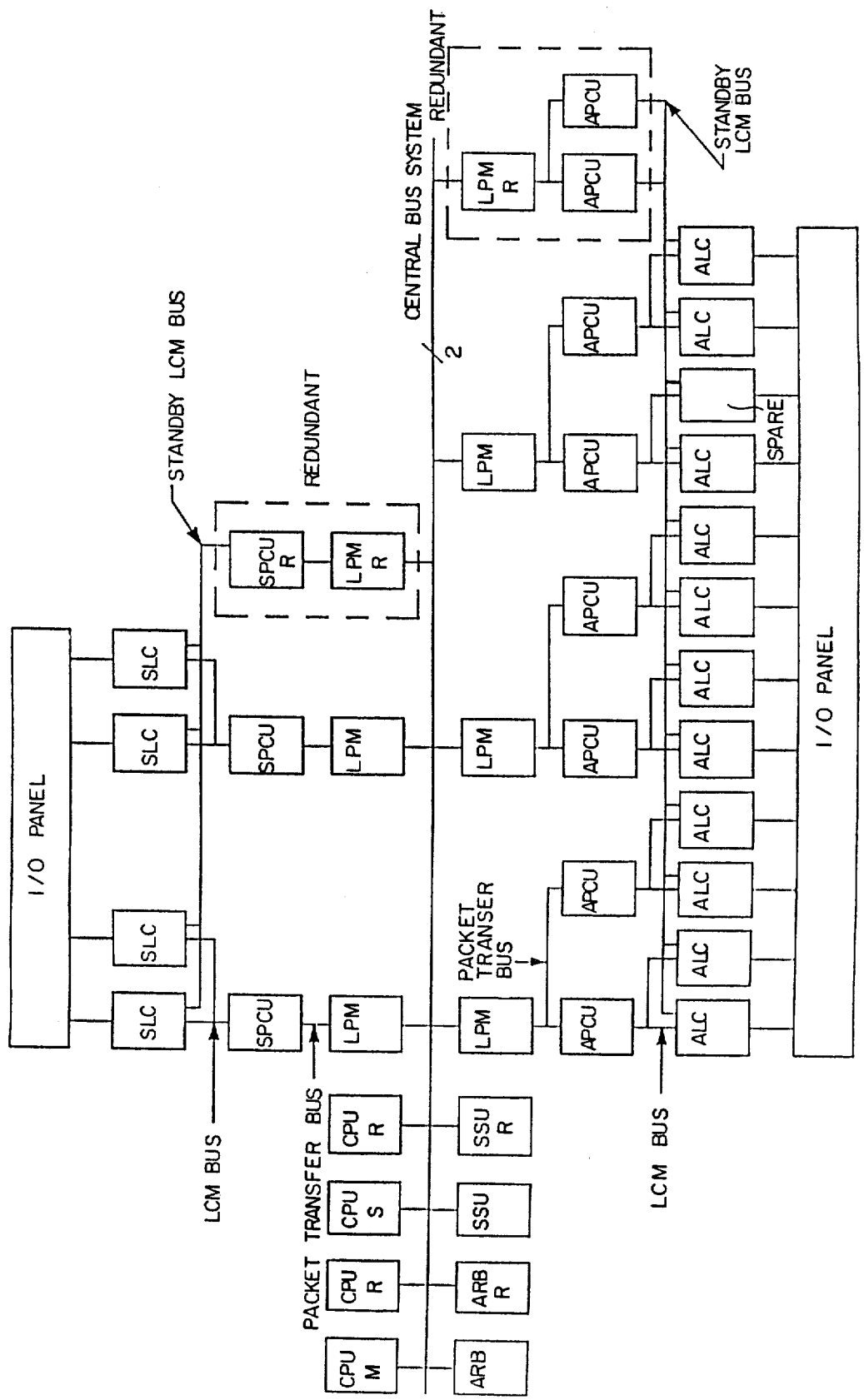
FIG. 4 is a functional block diagram of an exemplary 200-port packet sWitching unit according to the present invention.

An exemplary 200-port PSU according to the invention is shown in FIG. 4. An incoming frame of data at the respective I/O panel enters the TF and will traverse its respective LC (synchronous or asynchronous, respectively, as the case may be, depending on the data source/user) until it reaches the associated PCU, where media access control takes place. The data packet is then transmitted over a PTB to the associated LPM of the SF, and is then forwarded over the CBS to the SSU. The incoming LPM communicates with the CPU via the SSU. Upon notification by the CPU, the outgoing LPM will transfer the packet from the SSU to its local storage area. The respective PCU then performs media access control, and forwards the packet from the specified port over an LC.

Figure 2:
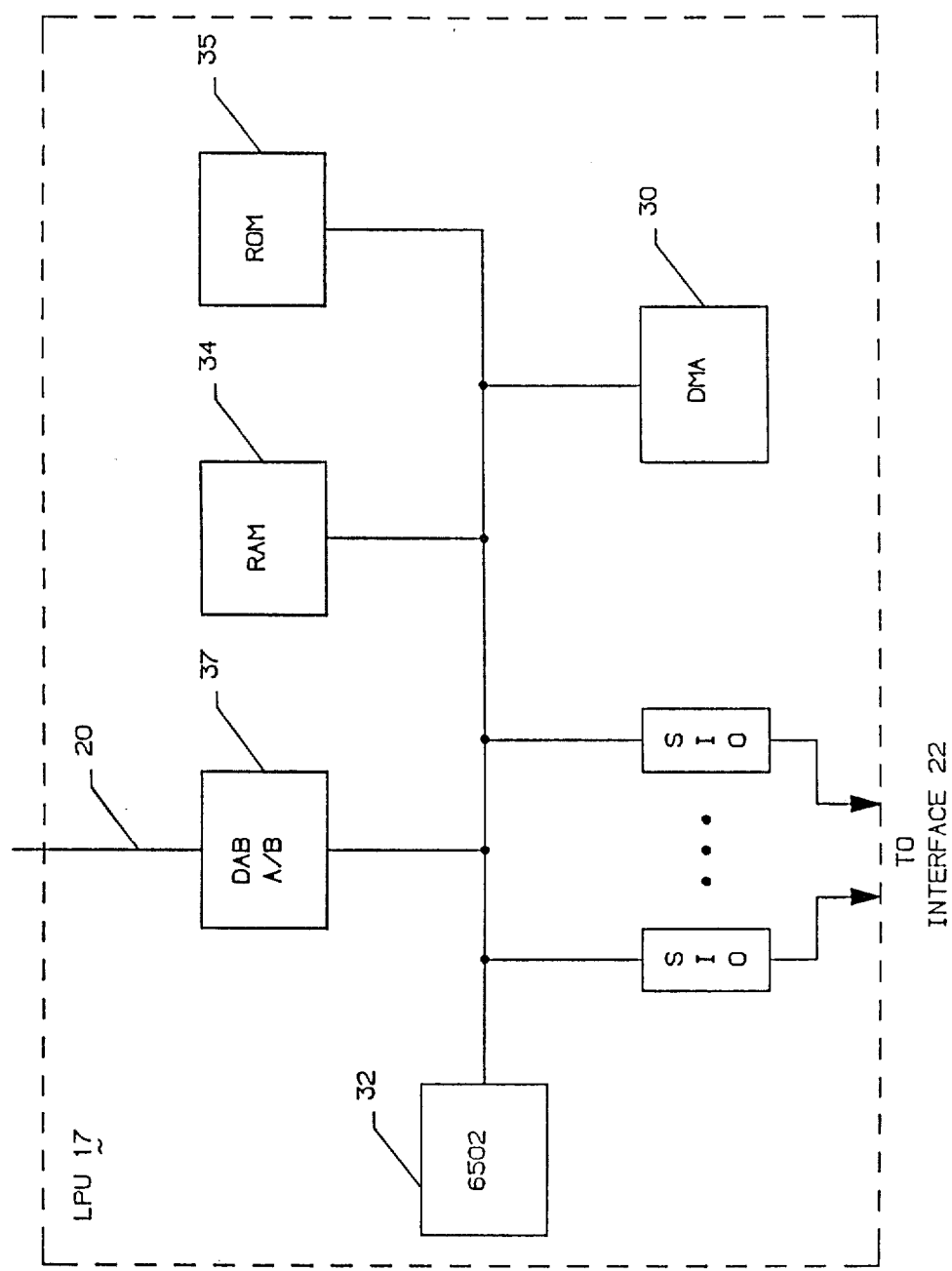
Figure 3:
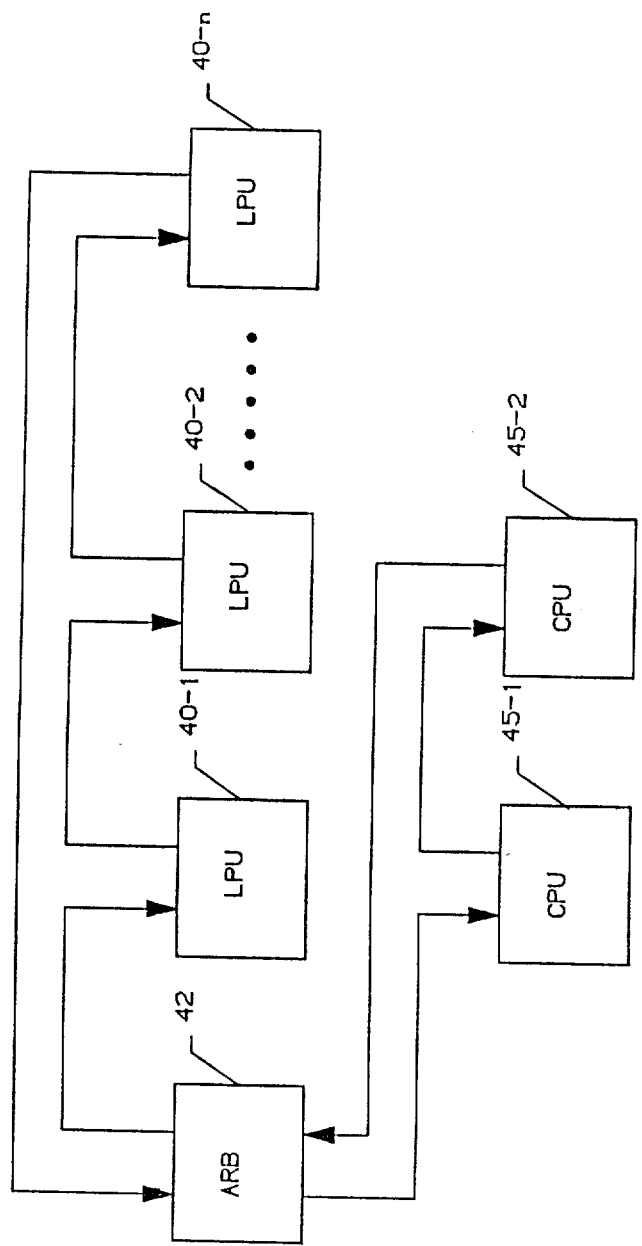
Figure 5:
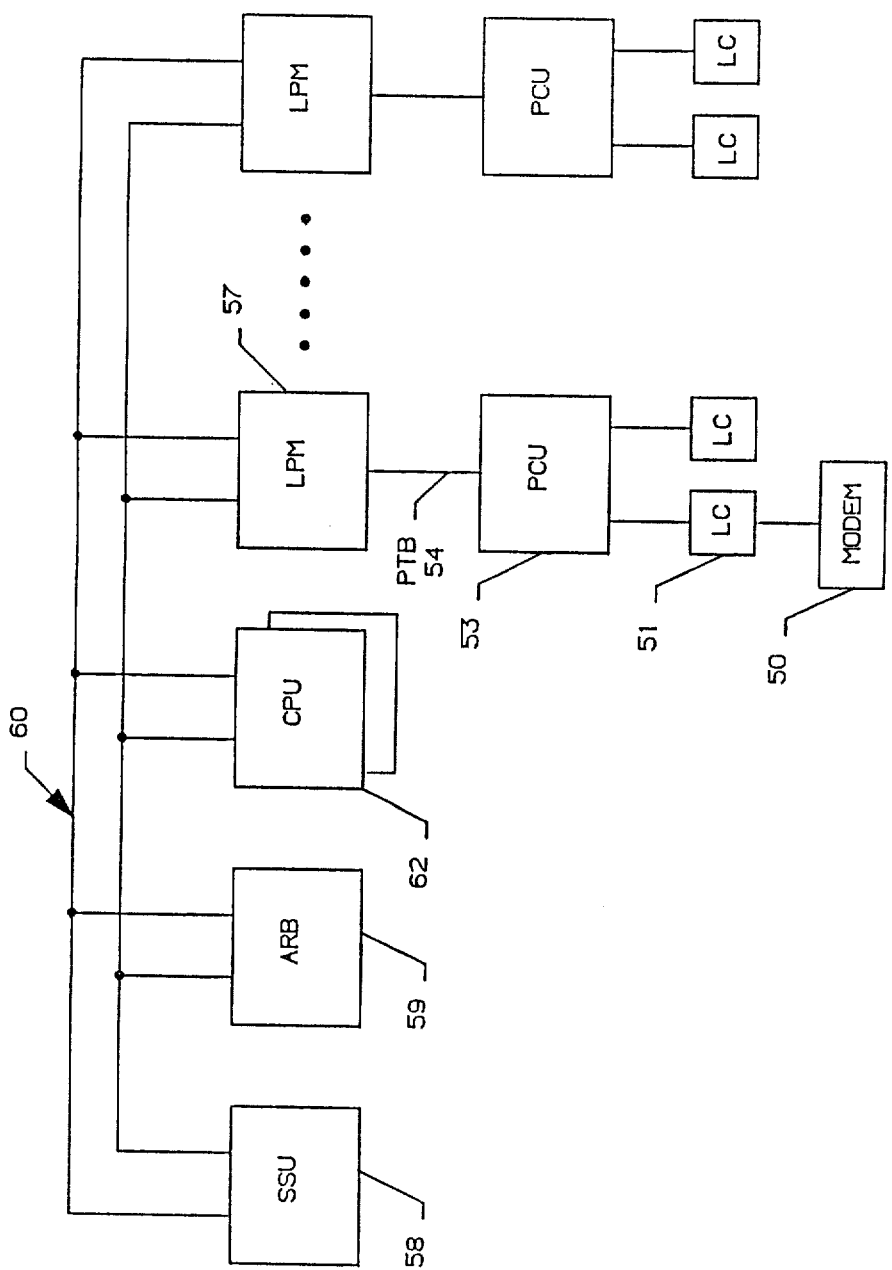
FIG. 5 is a simplified functional block diagram of the presently preferred embodiment of a TP4000/III packet switch according to the invention.

A simplified portrayal of the basic path of the data is illustrated in the block diagram of FIG. 5. A comparison of FIGS. 1 and 2 will reveal that the path taken by the data and the basic operations on the data in the new TP4000/III generation are analogous to those in the prior art TP4000/II generation, which is absolutely essential to the desired retention of substantially the same basic software architecture as was utilized for the earlier switch. The data entering from a port (or modem) 50 proceeds into an LC 51, which converts RS 232, or whatever levels are applicable, to TTL. Beyond that point, everything is handled in TTL. The converted data is delivered to the associated PCU which has serial IO ports to handle the very lowest level in the protocol, a conversion from serial to parallel data. The converted data is transferred over PTB 54 to the LPM 57, which handles the higher level functions of the protocol and performs the packet assembly/disassembly functions. In the new generation switch, the main memory of the SSU 58, the arbitrator 59, and the bus 60 are individual units or entities, unlike the integral unit of the TP4000/II. Hence, in the event of a failure on the bus, only the bus need be switched, to the redundant bus of the CBS. There is no need to switch to the redundant arbitrator or SSU. Similarly, if there is a failure in the SSU, only the SSU is switched; and the same applies to the ARB. AccordinglY, each of these units can be switched out independently. Data packets are transferred out of the ZSSU by the LPM upon notice from the CPU 62.

Figure 6:
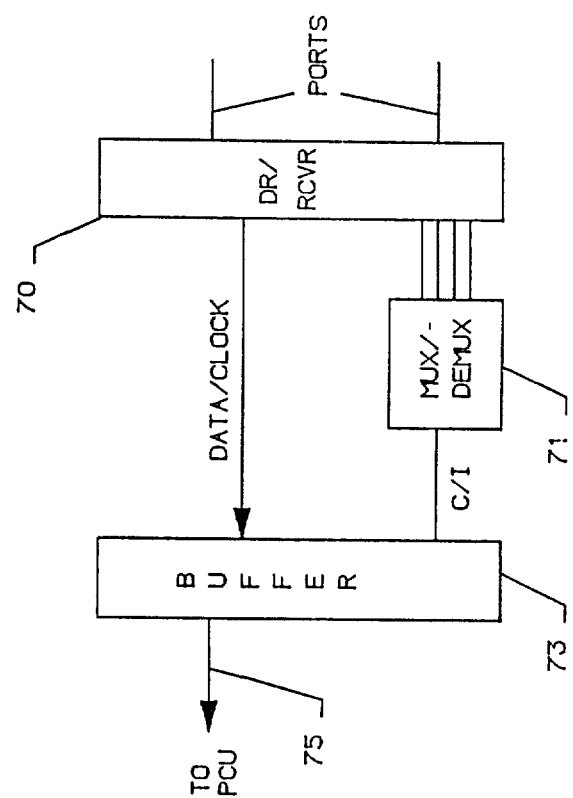
FIG. 6 is a simplified functional block diagram of a level converter suitable for use in the presently preferred embodiment.

A simplified block diagram of a Level Converter (LC) suitable for use in the presently preferred embodiment of the invention is shown in FIG. BY way of example, it is assumed that level conversion is to be effected from RS 232 to TTL. Two ports are provided at the drivers/receivers 70. The incoming data from a port is clocked straight through the receiver, while incoming parallel indication signals of the control/indication (C/I) signals are multiplexed by a multiplexer/demultiplexer (MUX/DEMUX) 71 (and conversely, outgoing serial control signals are demultiplexed for data being retransmitted by the switch). The data and the indication signals are entered into buffers 73 and then proceed out onto the LCM bus 75 that connects to the PCU (e.g., see FIG. 4). If additional ports are to be accommodated, additional LC chips are required; for example, for an 8-port LC card, four LC chips of the type shown in FIG. 6 are required to be mounted on the card. All of the data/signal paths in the LC are bidirectional. The demultiplexing and multiplexing of the C/I enables more efficient use of backplane signals and reduces the number of pin connections on the backplane.

Figure 7:
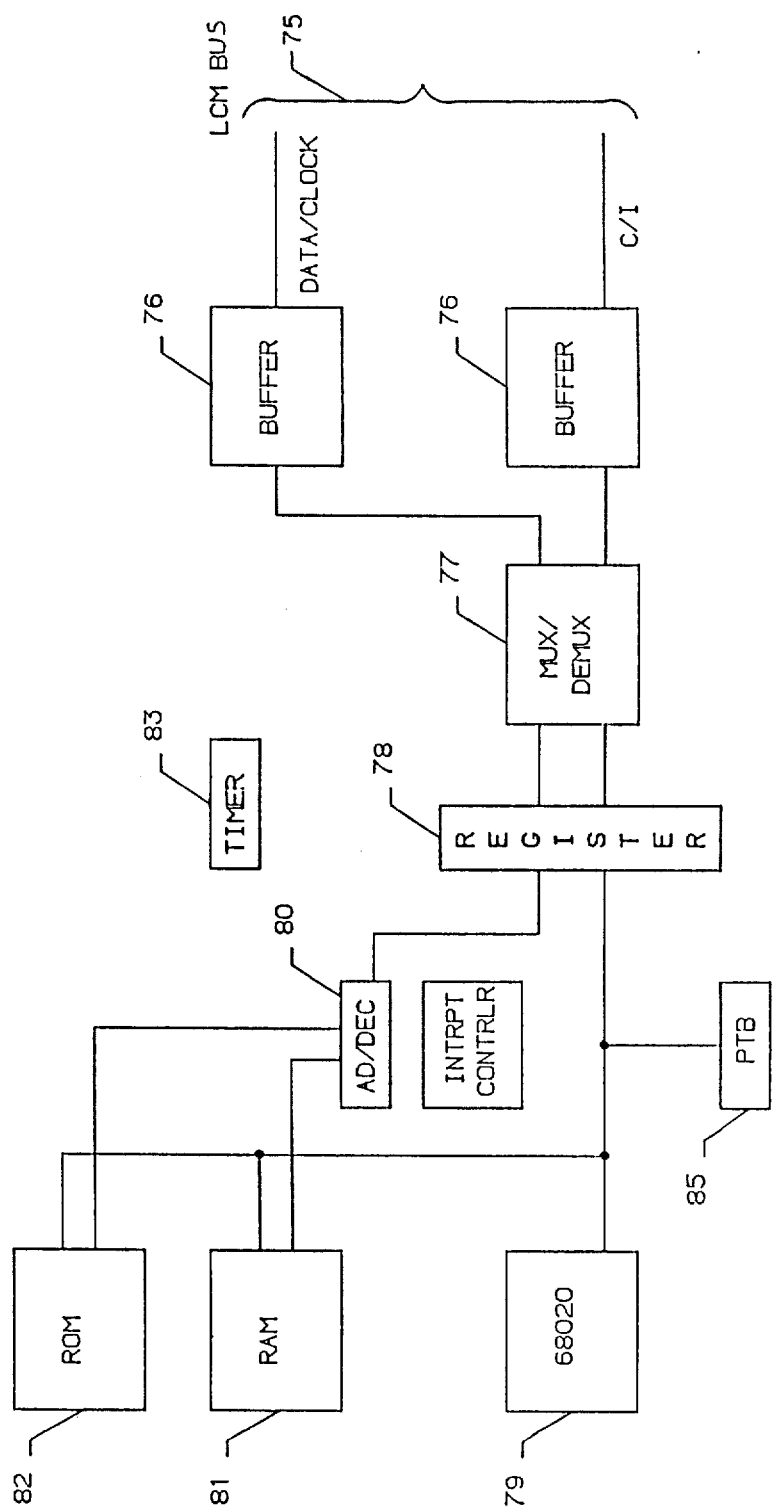
FIG. 7 is a simplified functional block diagram of a protocol control unit suitable for use in the presently preferred embodiment.

A simplified block diagram of a Protocol Control Unit (PCU) suitable for use in the presently preferred embodiment of the invention is illustrated in FIG. 7. Incoming serial data from the LCM bus 75 is inputted together with clock signals and control and indication (C/I) signals to respective buffers 7B. Multiplexer/demultiplexer (MUX/DEMUX) 77 in the paths from the buffers serves to demultiplex the incoming control (status) signals and to multiplex the outgoing indication signals to the LC. Control signals are multiplexed on the PCU and demultiplexed on the LC, whereas indication signals are multiplexed on the LC and demultiplexed on the PCU. Data and clock signals are not multiplexed. The C/I signals as received at respective buffer 76 from the LCM bus are in serial format. The data/signals are converted from serial to parallel format (and vice versa for the return path) by demultiplexing into a bank of 8-bit control registers 78 that are readable by a Motorola 68020 microprocessor 79. Conversely, the microprocessor has the capability to write the outgoing data into the control registers for multiplexing onto a single serial line to the LC unit.

An address decoder 80 in the PCU monitors and decodes data on the address bus to determine whether a address is indicative of desired access to RAM 8!. If so, the decoder transmits a signal to the RAM announcing the selection, and also signals the ROM 82 and the registers 78. A timer 83 monitors the control signals to ascertain whether a bus error has occurred—a condition in which data or signals have been on the bus an inordinate amount of time. If the timer detects such bus error, indicative of a failure to respond somewhere in the PCU, the timer issues a signal representative of an error-answer back to the affected source unit to terminate the cycle. An interrupt controller 84 monitors interrupts, which are asynchronous events, and together with the microprocessor issues a signal to acknowledge and service the interrupt. The parallel data in the registers is read out by the microprocessor to a PTB interface for entry onto the PTB to the LPMs.

In a typical configuration, the cards constituting the LCs and the PCUs are installed in a single cage, for example a two high cage, in an array of a PCU and two LCs, another PCU and two LOs, and so on, filling up the cage. The LCM bus between the PCU and the LCs is only on the backplane, carrying signals between the two associated cards (one with the PCU and the other having the two LCs). Ribbon cables run from the LCs to the 10 panel (FIG. 4), to distribute all of the signals to connectors which accept standard cable connectors.

Figure 8:
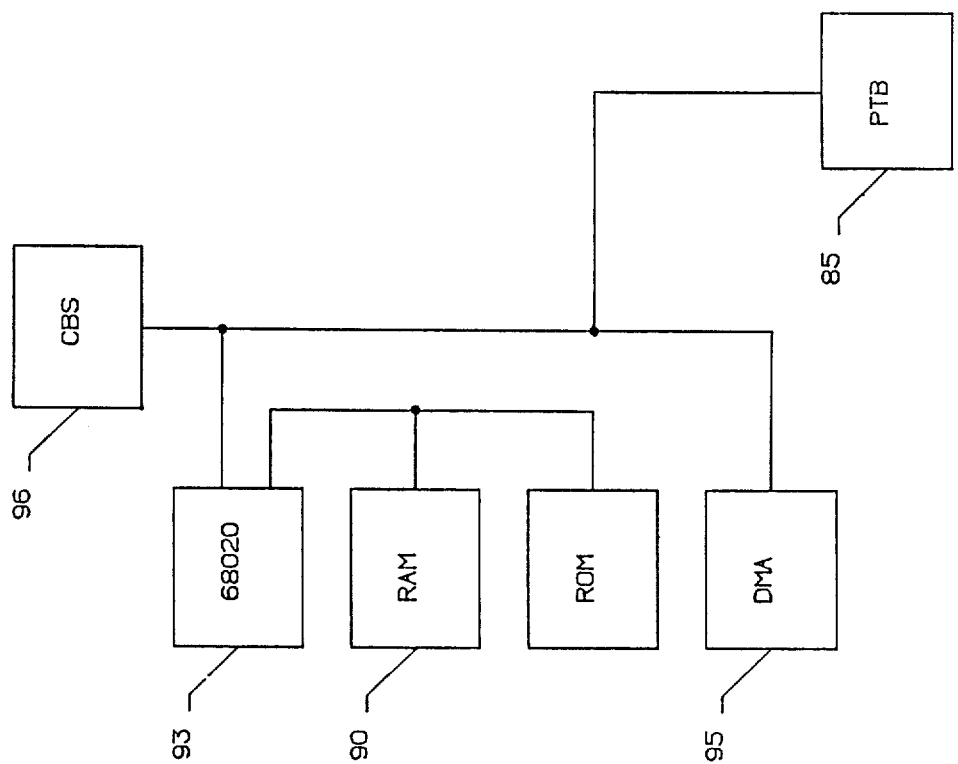
FIG. 8 is a simplified functional block diagram of a line processing module suitable for use in the presently preferred embodiment.

Referring to FIG. 8, a Line Processing Module (LPM), suitable for use in the presently preferred embodiment of the invention, receives data transferred across the PTB 85 under the control of the PCU microprocessor into the LPM's RAM 90. The LPM's own 68020 microprocessor 93 then packetizes (assemblies into packets) the information, performs protocol functions on the data packets, and programs an associated DMA controller 95 to transfer the data packets out of the RAM and onto the CBS 96 to the SSU in the switch facility.

The Central Processing Unit (CPU) card (not shown here, but in some detail in FIG. 17 below) suitable for use in the presently preferred embodiment of the invention is very similar to the LPM card, lacking only the PTB interface of the latter. The CPU card serves as a single board computer, only to handle the protocol. It does not function as an interface or have any bus connections except to the CBS.

Figure 9:
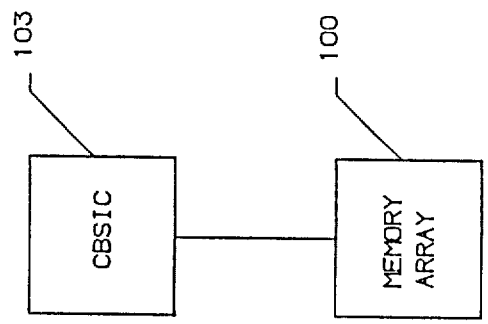
FIG. 9 is a simplified functional block diagram of a shared storage unit suitable for use in the presently preferred embodiment.

With reference to FIG. 9, a Shared Storage Unit (SSU) suitable for use in the presently preferred embodiment of the invention is very simply a memory array 100 connected to the CBS interface 103.

Figure 10:
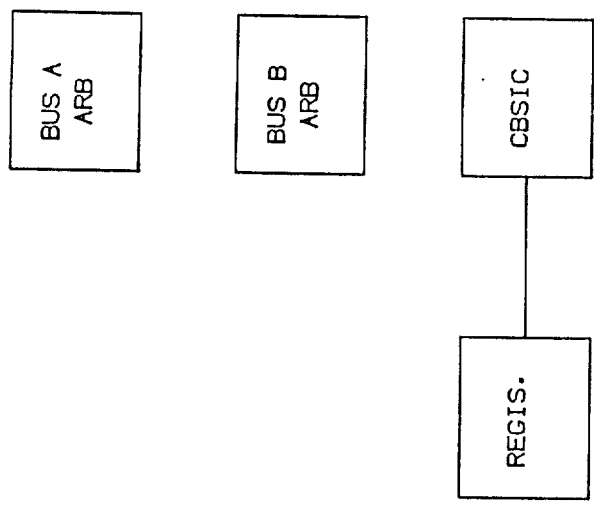
FIG. 10 is a simplified functional block diagram of an arbitrator unit suitable for use in the presently preferred embodiment.

The card for the Arbitrator (ARB) suitable for use in the presently preferred embodiment of the invention is shown in simplified functional block diagrammatic form in FIG. 10. The ARB employs logic that functions independently for the two buses A and B of the CBS. The ARB receives bus requests from all of the LPM and CPU cards, and functions according to an algorithm for issuing bus grants. In addition to interfacing to both buses, the ARB has several registers interconnected to the CBS interface, some of which are for configuring the arbitration logic, and a real time clock. It is configured in a single cage, but provides the capability of cascading three-high cages through its intercage bus.

The arbitration in the TP4000/III switch consists simply of bus requests and bus grants. Every LPM card and every CPU card has a bus request line. There are bus requests and bus grants for bus A, and similarlY for bus B. The ARB receives all of the bus requests, and decides which card will get the bus. In essence, card assignments are made in two different priority groups, one group of high priority and the other of low priority.

The assignment is programmable as to each individual card, and the programming permits not only the designation of a card as being either in the high priority or the low priority grouping, but also allows dictating the percentage of time that the high priority group will obtain access to the bus relative to the percentage of time for the low priority group. For example, the programming may be such that out of every five requests for access, four are granted to the high priority group and only one to the low priority group; or access may be slanted to an even greater extent to the high priority group, say, 16-to-1 or more. Accordingly, if an LPM is handling considerable data traffic and therefore requires greater bandwidth, it is readily programmed to be placed in the high priority group. On the other hand, an LPM which is handling relatively little traffic may be placed in the low priority group, recognizing that it is not operating at peak performance levels and therefore can wait somewhat longer to obtain access to the bus; i e., it is keeping pace with the incoming traffic.

The arbitration scheme employed in packet switches according to the present invention assures that each time the ARB receives a bus request for a high priority group card, the ARB will issue a bus grant within one clock cycle when there is no contention for the bus requested. Hence, the bus protocol assures that the bus is being utilized to its full bandwidth. Unlike the prior art arbitration schemes in which a requester may be forced to wait until a token is passed to it before its request may be transmitted, or to wait through many clock cycles to accommodate some other protocol despite the possibility that it is the only requester, the presently preferred system allows any unit to request the bus at the instant access is desired and to be granted access within a reasonable time after the request is received by the ARB, depending on the assigned priority.

The protocol on the CBS is a time multiplexed synchronous bus. Each card requiring access to the bus issues a bus request to the ARB concomitant with its need. When a bus grant is returned to that card, it commences to drive address and data onto the bus. The upper 8 bits of the address field constitute the address of another card in the system, most often that of the SSU. In the latter instance, the upper 8 address bits of the data address the SSU, and the lower 24 bits of the 82-bit address (on a 32-bit data bus) would address a particular location in the SSU. This address/data is driven onto the bus over a very short time interval, a single clock cYcle, and is latched in on the SSU via a buffer. At that point, the bus is released. Accordingly, another card may request the bus to transfer data to another card—the SSU or some other card with which communication is sought—immediately following this release of the bus.

If access is made on the SSU, the SSU must request the bus when the access is completed. The SSU therefore passes a bus request to the ARB. When the bus grant is issued, the SSU will address the appropriate LPM and return an acknowledgment to the requesting card. This is assured by means of a tag field within the initial address data identifying the card that originated the access on the bus. The identifying data is stored by the SSU and returned as the upper address bits when the acknowledgment is transmitted onto the bus.

This technique assures essentially synchronous operation at the lowest levels, where for example in a particular clock cycle, the data and an address are transmitted on the bus to the SSU. Then, in the next clock cycle data might be directed from the SSU to an LPM. The very next cycle might be occupied in part by the acknowledgment from the SSU to an originating LPM. It should be apparent from this operation that bus access is controlled over extremely small intervals, as little as a slice of each clock cycle. Nevertheless, an SSU acknowledgment may be delayed for any desired number of clock cycles, which means that arbitration can be accommodated for cascaded card cages. Although such an accommodation will take additional time, it allows use of the same clock cycle slices among the different cages. If data is transmitted to a card in another cage, the card is readily identified by the upper 8-bit address or the tag field of the data. The additional time required for such operation compared to access and transmission between cards in the same cage is acceptable and handled by the bus protocol, and most importantly allows the cascading of cages and the attendant accommodation of a considerably greater number of ports by a single packet switching unit.

Figure 11:
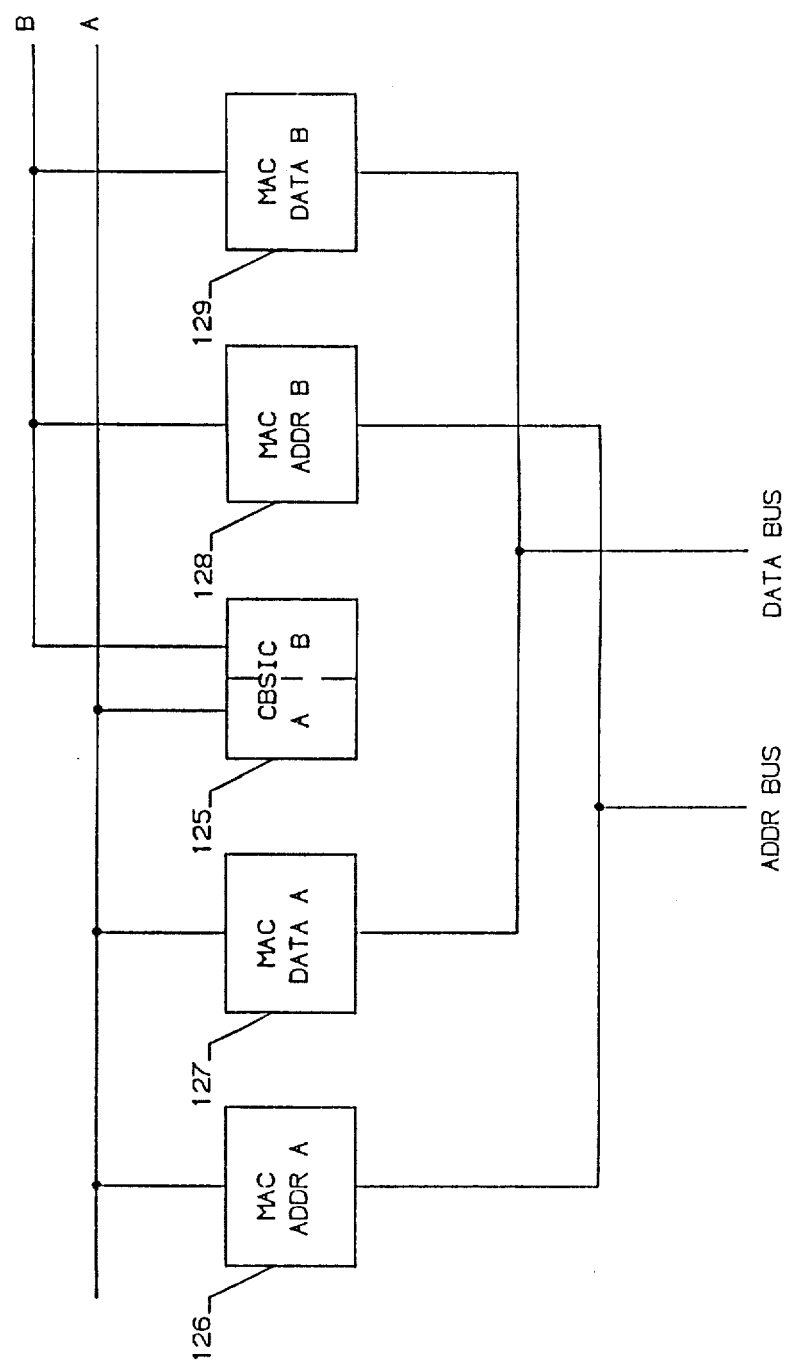
FIG. 11 is a simplified functional block diagram of the central bus system interface suitable for use in the presently preferred embodiment.

Referring now to FIG. 11, the Central Bus System (CBS) interface suitable for use in the presently preferred embodiment of the invention includes a CBS Interface Controller (CBSIC) 125 and several Media Access Controllers (MACs) 126–129. Each MAC is adapted to function either as a data controller or an address controller. Accordingly, MACs 126 and 128 are configured for use on the address buses for bus A and bus B, respectively, and MACs 127 and 129 are configured for use on the data buses for bus A and bus B, respectively. The CBSIC 125 acts as a control buffer for both buses A and B. The internal buffer within each of the MACs and the CBSIC permits the establishment of data queues. The internal buffer is required because of the asynchronous nature of the protocol. The extent of incoming traffic is sufficient great that logic and memory arrays, for example, are too slow to process the information. With the internal buffer, incoming requests can be queued. Each of the MACs on the address buses also contains logic for decoding the upper 8 address bits. The logic performs a comparison to determine whether is intended for that unit or for a different unit. In addition, the MACs and CBSIC are adapted to communicate with one another to assure they are functioning properly.

Figure 12:
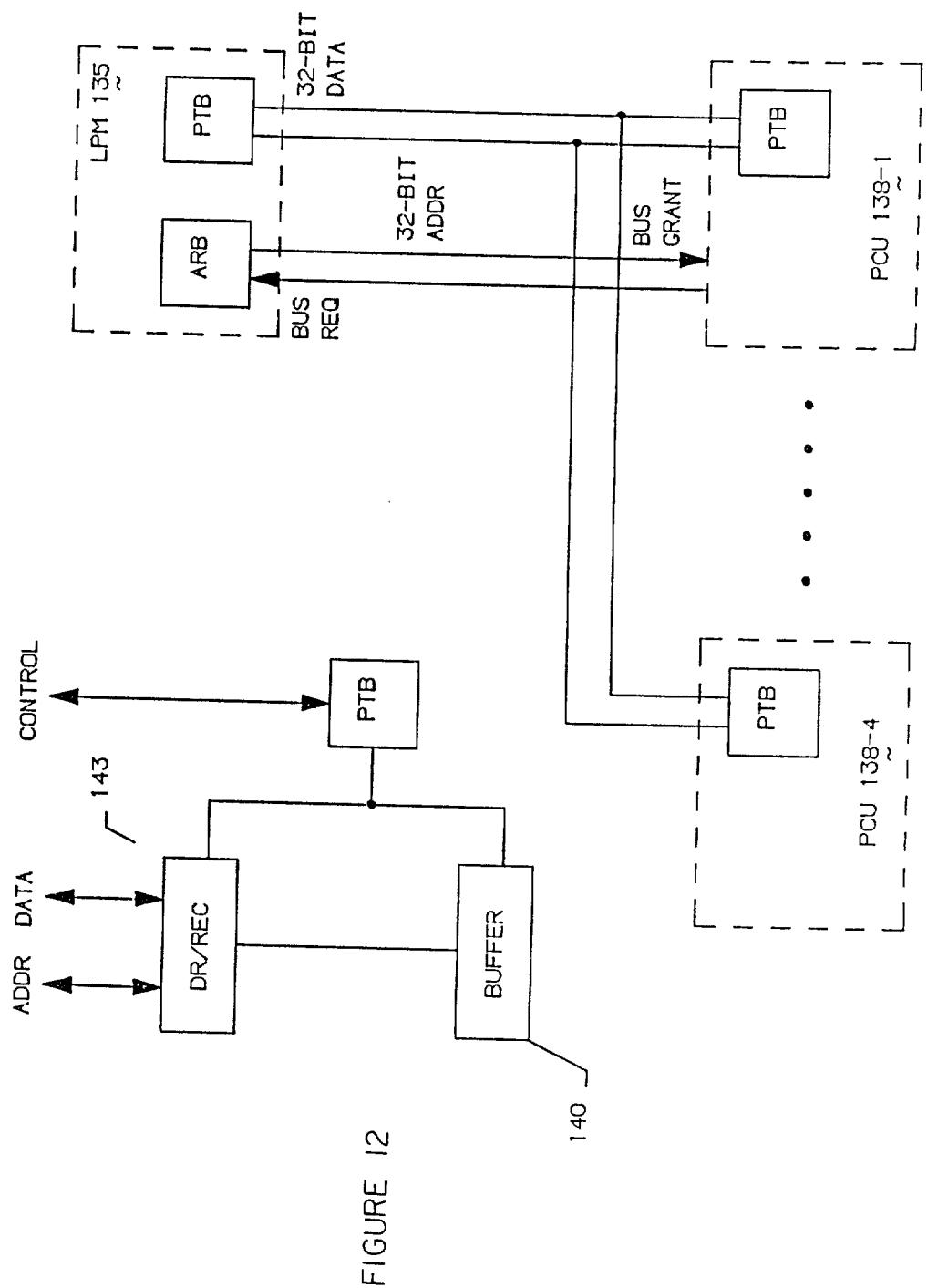
FIG. 12 is a simplified functional block diagram of the packet transfer bus suitable for use in the presently preferred embodiment.

Referring now to the Packet Transfer Bus (PTB) suitable for use in the presently preferred embodiment of the invention, and shown in the simplified functional block diagram of FIG. 12, the bus is asynchronous and the address and data are multiplexed for efficiency. Arbitration for access to the PTB is performed within the LPM 135. A single request line and a single grant line may be made available, with bus requests coming in from each applicable card and bus grants dispatched back to the respective cards. Whichever card is given the bus grant will remain on the bus until access is made and the acknowledgment is received. The PTB functions as a controller for both the LPM 135 and the PCUs 138-1 through 138-4, with control signals from the PTB activating and deactivating the buffer 140 on each of those cards. The levels on the PTB are RS45, because relatively long distances may be present here and TTL is not easily driven over such distances. Level RS45 allows the use of longer cables with no significant reduction of speed. RS45 drivers and receivers 143 are connected to the buffer on each card, and are also controlled by the PTB.

B. Preferred Embodiment Device Details

Figure 13:
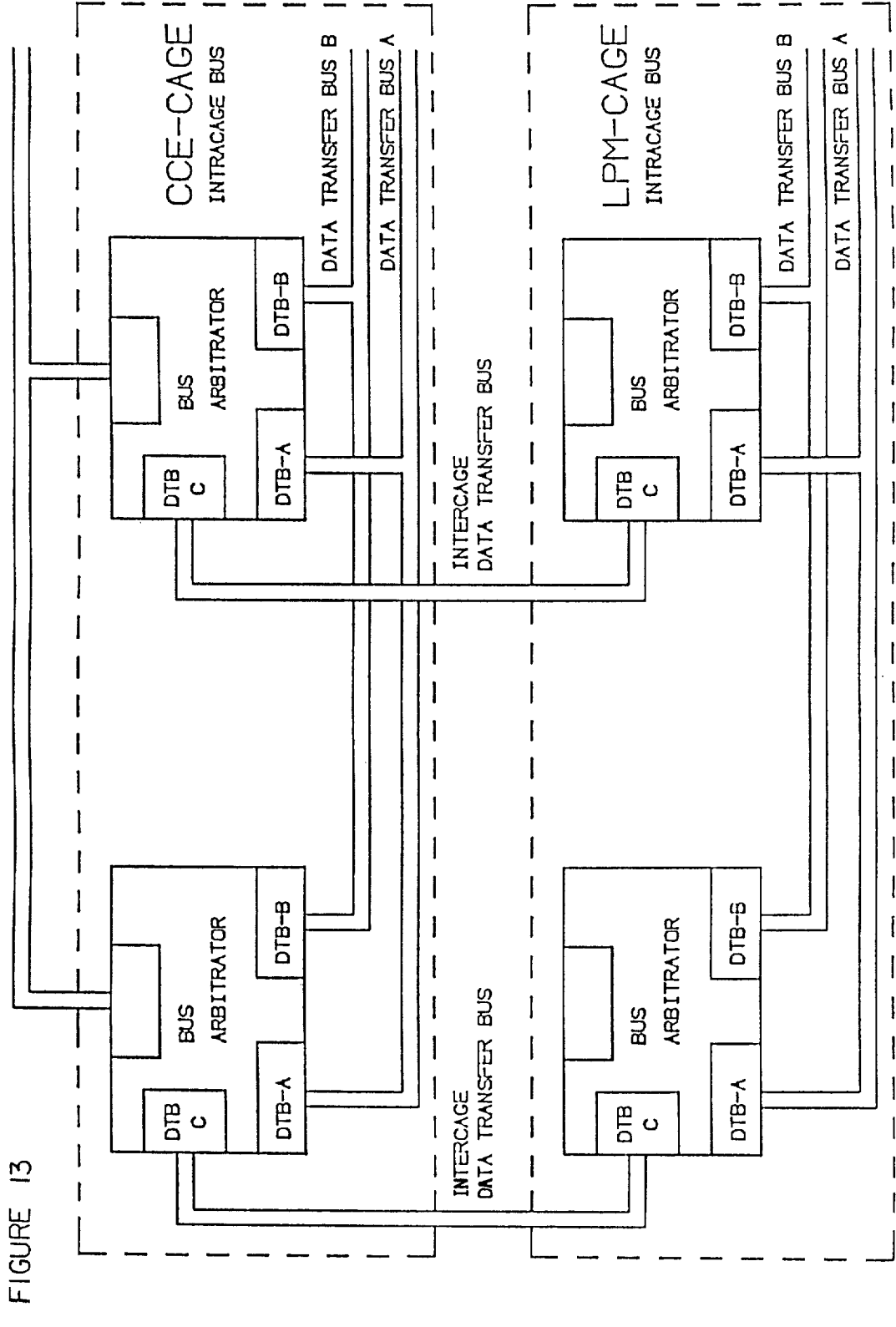
FIG. 13 is a more detailed functional block diagram of the central bus system used in the packet switching unit embodiment of FIG. 4.

FIG. 13 is a more detailed block diagram of the Central Bus System (CBS) for the presently preferred embodiment of the packet switch according to the present invention. The CBS is a redundant parallel bus system which includes the intracage and intercage buses. The intracage bus is a backplane bus consisting of two independent 32-bit data transfer buses (DTBs) providing the communication link between all modules (cards) within the within the respective CCE-Cage and LPM-Cage. The two cages are interconnected by the intercage bus which also consists of two independent 32-bit DTBs, here interconnecting the bus arbitrators (ARBs) within the several cages.

Each DTB supports cards operating either as master or slave or both. The master initiates a bus cycle to access a slave, whereas the slave may only respond to bus cycles directed to it. A card operating as both master and slave is adapted to initiate and to respond to bus cycles. Three types of bus cycles may be executed on the CBS, viz., (i) read, (ii) write, and (iii) read/modify/- write; each cycles consisting of separate request and response phases. During a request phase, the master transmits address and write data (write cycle) onto the CBS. During the response phase, the slave transmits acknowledgment of the request and return of read data (read cycle) onto the CBS.

Arbitration is performed in a centralized manner by the ARB for each cage (as noted earlier herein, ARB redundancy is provided for each cage). The respective ARB determines the Winner of the next bus cycle among intracage requests from up to 20 cards, including the ARB card itself, and from among up to four intercage requests.

Events occurring on the DTB are synchronized to one central clock operating at 12.5 MHz. The ARB in the CCE-Cage distributes bus clock to the CCE-Cage intracage buses, the LPM-Cage intracage buses, and the intercage buses. Each DTB consists of a 32-bit address bus and 32-bit data bus, and will accommodate data which is 8, 16, 24 or 32 bits wide. The width of the data transmitted may be altered on each bus cycle. The CBS supports misaligned word and long word accesses.

Data may be transferred directly between any master and slave within a 3-high (3H) cage via the intracage DTB, which provides a bus connection between all cards within that cage. A master seeking to initiate a bus cycle within its 3H cage must gain access to its intracage bus by asserting a request to the ARb. The ARB receives all requests to access the intracage DTBs (A and B), and will grant bus access to the highest priority bus requester. The master may then access any slave within the same 3H cage. Data may also be transferred directly between any master and slave residing in different 3H cages. To that end, the request must traverse the master's intracage bus, the ARB residing in the slave's 3H cage, the intercage bus, the ARB residing in the master's 3H cage, and the slave's intracage bus. The response will traverse those components in the reverse order.

When the master transmits an intercage request on the intracage bus, the ARB recognizes it as an intercage access and will act as a slave, capturing and storing the information on the bus. The ARB Will then arbitrate for the intercage bus and transmit the stored information, acting as a master. The ARB in the slave's 3H cage recognizes its cage address and captures and stores the information transmitted on the intercage bug. The ARB will then request access to the intracage bus and upon being granted access will transmit thereon. The slave recognizes its address on the bus and will capture the information thereon and perform the specified bus cycle, returning the response across the same path.

Figure 14:
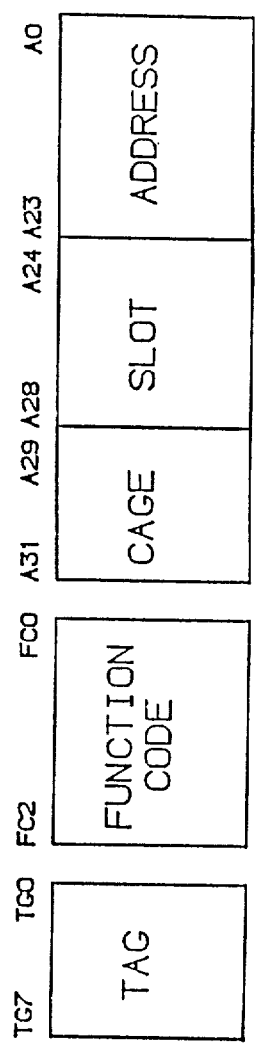
FIG. 14 is a chart showing an exemplary central bus system address space including elements of each address for modules utilized in the packet switching unit embodiment of FIG. 4.

A tag field, consisting of an 8-bit address field added to the existing 32-bit address bus to identify a particular data transfer, decouples the master and slave from the buses during the data transfer to improve throughput. The tag precludes the bus from being tied up for more than one bus cycle in each direction (request and response), but the bus must be requested in each direction. A CBS address space is shown in FIG. 14, indicating the location of the tag. The slot refers to a position within the 3-high cage in which a card may be inserted into the 3-high backplane.

When a requester transmits on a bus, a tag field is also transmitted, in this case identifying the requester's cage and slot address and decoupling the requester from the buses. During the request phase of a bus cycle, the master transmits its cage and slot address on the tag field; and during the response phase, the slave does the same with respect to its address information. A requester will only drive the bus for one clock cycle, thereby enhancing bus throughput by freeing the bus for other requesters.

Figure 15:
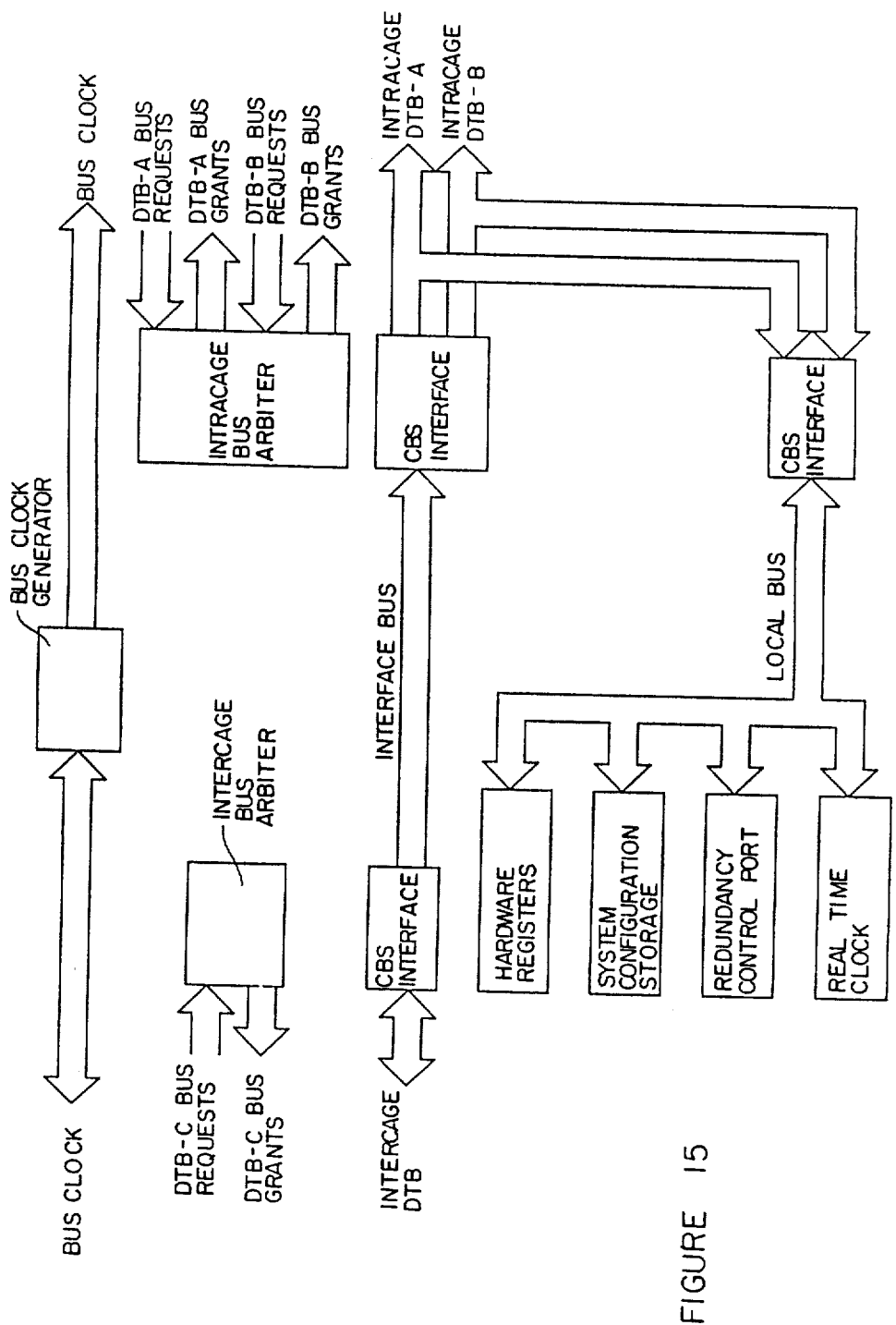
FIG. 15 is a more detailed functional block diagram of a bus arbitrator for the packet switching unit embodiment of FIG. 4.

Referring now to FIG. 15, the Bus Arbitrator (ARB) resides in the Switch Facility, and has the primary functions of arbitrating accesses to the intracage and intercage buses, and to buffer data transferred between chassis when the Switch Facility is configured with multiple 3-high chassis. In performing arbitration for each of the two DTBs on the 3-high backplane, the ARB receives a Bus Request signal (including its own) and drives a Bus Grant signal to each of the 20 slots in the backplane. The ARB in the CCE-Cage performs the arbitration function for the Intercage Bus, and generates and distributes Bus Clock via the backplane and intercage cabling to all cards in the Switch Facility.

Each ARB has the necessary logic to buffer data transferred between the CCE-Cage and the LPM-Cage, and contains an interface to each of the two intracage DTBs and an interface to the single intercage DTB. The ARB further contains two kilobytes of nonvolatile system configuration storage, a real time clock, and hardware registers. An LPM/PCU redundancy control port in the ARB notifies LCs to switch to backup LCM/PCU pairs. By providing one-for-one redundancy, the detection of a failure of an ARB causes the standby ARB in the same cage to be switched to the operational state.

An ARB consists of the following primary functions: an intracage Bus Arbiter for DTB A and DTB B, and intercage Bus Arbiter, an intracage bus interface for DTB A and DTB B, an intercage bus interface, an intercage interface bus, a bus Clock Generator, a local bus interface, local bus functions, an LPM redundancy control port, and an Arbitrator control port. Arbitration for Intracage DTB A and B and Intercage DTB is performed in parallel on every bus cycle. A CBS interface chip is used at each interface to buffer the transfers between the intracage bus and the intercage bus. Parity is checked for data transfers through the ARB. The intercage interface bus connects the intercage bus interface and the interface to the intracage buses. The Intercage Bus Arbiter controls access to the intercage interface bus. The local bus includes the local bus interface, local bus address decoder, local bus hardware registers, system configuration storage, real time clock, and local bus control The local bus interface consists of a CBS interface chip set to buffer transfers between the local bus and the intracage DTBs. The local bus address decoder enables functions on the local bus. The local bus hardware registers provide control and status information on the ARB and the CBS. The system configuration storage consists of 2K bytes of battery backed RAM. The real time clock provides clock/calendar functions. The local bus control controls the data transfers on the local bus. The LPM redundancy control port transmits serially the control bits generated by the CPU to the RCB.

In describing the data transfers that occur on the ARB, reference will be made to the Media Access chips within each CBSIC. In this portion of the description, the Intracage Bus Media Access chip is referred to as the AMA, the Intercage Bus Media Access chip as the EMA, and the Local Bus Media Access chip as the LMA. It will be remembered from the earlier discussion that each of the cards, or modules, within the LPM and CCE cages of the TP4000/III switch facility, as well as the cages themselves, are connected by the system of buses referred to as the C8S. Data transfers from one card in a card cage to another card in the same cage are "intracage" transfers, while transfers between cards in different cages are "intercage" transfers. All of the former data transfers must traverse the intracage bus, whereas all of the latter data transfers must traverse the intercage bus and two intracage buses. All cards in the system are capable of initiating information transfers, and this results in contention problems on the various buses, requiring the arbitration for the buses which is performed by the ARBs.

In an intracage to intercage transfer, a card on intracage DTB A asserts a Bus Request to the Intracage Bus A Arbiter, and receives a Bus Grant from that Arbiter. The requesting card then drives intracage DTB A, and all other cards including the AMA latch the data in, whereupon an ID check is performed on the latched upper eight bits of data by the AMA. Parity is also checked, and if no parity error is detected, the data is entered into the AMA input queue. The latter input queue then asserts a Bus Request to the Intercage Interface Bus Arbiter. Upon receipt of the Bus Grant from that Arbiter, the AMA input queue enables data to the Intercage Interface Bus and is latched into the EMA output queue. The latter then asserts a Bus Request to the Intercage Bus Arbiter, and receives a Bus Grant therefrom whereupon the EMA output queue enables data to the Intercage DTB. The ARBs in other cages latch the data in.

In an intracage to local bus data transfer, a card on the intracage bus asserts a Bus Request to the Intracage Bus A Arbiter, and receives a Bus Grant therefrom. The card drives intracage DTB A and all other cards including the ARB's LMA latch the data in. An ID check is performed on the latched upper eight bits of data by the LMA, parity is checked, and if no parity error is detected the data is entered into the LMA input queue. The LMA input queue asserts a Bus Request to the Local Bus Control, and, upon receipt of the Bus Grant, enables data onto the local bus.

In an intercage to intracage transfer, an intercage requester asserts a Bus Request to the Intercage Bus Arbiter, and receives a Bus Grant therefrom. The requester drives the intercage bus, and the ARB in each cage latches the data into its respective EMA. An ID check is performed on the upper eight bits of data by the EMA. After a parity check, if no parity error is detected the data is entered into the EMA input queue which asserts a Bus Request to, and receives a Bus Grant from, the Intercage Interface Bus Arbiter. The EMA input queue then enables the data to be entered into the AMA output queue. The latter asserts a Bus Request to and receives a Bus Grant from the Intracage Bus A Arbiter, whereupon the AMA output queue is enabled and the data is driven out on Intracage DTB A.

In an intercage to local bus data transfer, an intercage requester asserts a Bus Request to and receives the Bus Grant from the Intercage Bus Arbiter, and thereupon drives the intercage bus and the ARB in each cage latches the data into its EMA. After an ID check on the latched upper eight bits of data by the EMA, a parity check, and detection of no parity error, the data is entered into the EMA input queue which asserts a Bus Request to and receives a Bus Grant from the Intercage Interface Bus Arbiter. The data is then driven onto the Intercage Interface Bus and entered into the AMA output queue which asserts a Bus Request to and receives a Bus Grant from the Intracage Bus A Arbiter, and then drives the data onto the Intracage Bus A Arbiter. All other cards, including the LMA, latch the data in. The LMA performs an ID check, parity is checked, and if no parity error is detected the data is entered into the LMA input queue which asserts a Bus Request to and receives a Bus Grant from the Local Bus Control, after which the data is enabled onto the local bus.

In a local bus to intracage transfer, a local bus transfer is pending in the LMA output queue. The LMA output queue asserts a Bus Request to and receives a Bus Grant from the Intracage Bus A Arbiter, then drives the data onto the Intracage Bus A Arbiter, and all including the ARB latch the data into their media access chip.

Finally, in a local bus to intercage transfer, a local bus transfer is pending in the LMA output queue which asserts a Bus Request to one of the Intracage Bus Arbiters and receives a Bus Grant therefrom. The LMA output queue drives the intracage DTB and each card including the ARB's AMA latches the data in. The ID check and parity check are performed, and the data is entered into the AMA input queue, which asserts a Bus Request to and receives A Bus Grant from the Intercage Interface Bus Arbiter. The data is then entered into the EMA output queue which asserts a Bus Request to and receives a Bus Grant from the Intercage Bus Arbiter, and enables the data onto the Intercage DTB. The ARBs in each cage latch the data in.

For both the Intracage Bus Arbiters and the Intercage Bus Arbiter, bus arbitration is performed on every bus clock cycle. The ARB latches in Bus Requests on every falling edge of the bus clock, and arbitrates them based on the pending requests and on the arbitration algorithm. On the next falling edge of the bus clock, the Bus Grants are latched out with one Bus Grant signal asserted, the latter being asserted for one bus clock cycle. The card receiving the Bus Grant drives the bus at the next rising edge of the bus clock. When a bus requester is granted the bus, its Bus Request signal remains asserted on the next cycle because the Bus Grant was latched out on the same clock edge that the Bus Request was latched in. The arbitration algorithm ignores this second request because it may or may not be a real request. Thus, a card may not use the bus on consecutive bus cycles.

The ARBs grant the use of an active bus during every cycle in which one or more cards requests use of the bus. The arbitration algorithm guarantees equitable access to all cards and prevents deadlocks on the buses. Requests for the DTB are prioritized into high priority and low priority classes. Each slot within a cage can be configured to be either high priority or low priority by programming the ARB located in the respective cage. The arbitration algorithm functions with any combination of cards and cages, up to maximum configurations allowable, and removal of cards from or installation of cards into slots does not disrupt or otherwise affect arbitration or the programmed priorities.

Each slot has one bus request line to and one bus grant line from the ARB for each of the two DTBs. A card may only request access to an active DTB. When two DTBs within the CCE-Cage are actives requests for access to the two DTBs may be evenly distributed by programming the cards to alternate requests between both buses. A card requiring DTB access activates its bus request line for the DTB to which access is sought. The ARB for the respective cage receives all requests and grants the next bus cycle to the requesting card having the highest priority among all requesters, by activating that card's bus grant line for the DTB requested.

An Intracage Bus Arbiter exists for both Intracage DTBs and each such Arbiter functions independently of the other. If the ARB sets the respective DTB active, the Intracage Bus Arbiter is enabled on that DTB, thereby permitting the ARB to control access to the bus. Intracage bus requesters are assigned to either a high priority group or a low priority group by appropriate programming of a Bus Requester Priority Register (BRPR) in the Arbiter. At reset, all requesters are placed in the low priority group and then the pending bus requests are routed into the appropriate group as determined by the BRPR settings. An Intergroup Arbiter within the Intracage Bus Arbiter determines the winner of the bus between the high priority group and the low priority group, and the extent of priority that the former has over the latter as a percentage of the number of bus cycles is selectable on the BRPR. In the preferred embodiment, the selection may be made by programming among any of two, four, eight, or twelve consecutive cycles. For example, if the group priority is set at four, the low priority group will receive priority only after the high priority group has held the bus for four consecutive bus cycles, assuming at least four high priority requests had been present. That is, if after two consecutive bus cycles, no further high priority requests are pending, any low priority group request will be granted on the next bus cycle. Any subsequent high priority group request will receive immediate priority, and if on the next bus cycle, four or more requests are asserted by the high priority group, that group will retain the bus for the next four bus cycles before relinquishing priority to the low priority group.

Physical limitations of the Programmable Array Logic (PAL) devices used in implementing the arbitration logic in the presently preferred embodiment mandate that the 20 potential bus requests in a group be partitioned into five subgroups each having four bus requesters. Each of the PALs is referred to as a Member Arbiter (MARB) for its group of four requesters (requesting members). A MARB, whose function is the same whether it is in the high priority group or the low priority group, determines the winner between its four requesting members based on a rotating priority scheme to be described presently. Inasmuch as a PAL is utilized to implement a MARB, and itself is programmable, a number of different schemes may be used.

Insertion of a card into a slot in the cage requires the BRPR programming to be updated according to the latest system configuration if the replaced card required a different priority. Removal of a card (without replacement) does not affect arbitration since there will be no bus request from an empty slot.

By way of example, the arbitration algorithm used for designating priority in an arbitration for the Intracage Bus among four requesting members (cards) associated with a MARB is a rotating scheme, in the presently preferred embodiment. In this scheme, each requester has equal chance of winning the arbitration in the long term and the relative ordering between cards does not change. The arbitration winner receives the lowest priority for the next arbitration cycle while the card ordered behind the winner receives the highest priority. Cards not requesting access are ignored. If the only pending requester is the lowest priority requester, then that requester will be granted the bus. There is no rotation of priority when no requests are pending. If, for example, in cycle 1 card A has the highest priority and requests the bus, A Wins the bus. On the next cycle, A has the lowest priority and B (the next card in the order) now receives the highest priority. If, in that cycle, C and D request the bus, C has the higher priority and therefore wins the bus.

Arbitration for the Intracage Bus must be resolved in 80 nanoseconds (ns) to allow arbitration with the 12.5 MHz Bus Clock used in the preferred embodiment. The Bus Request signal must be stable to the ARB at least 3 ns prior to the falling edge of the bus clock. The Bus Grant is presented to the requesting card no more than 18 ns, not including backplane propagation delays, after the end of the arbitration cycle (i.e., the falling edge of the bus clock). Accordingly, in the preferred embodiment, the intracage bus arbitration function is performed using 15 ns PAL20B and 25 ns PAL20B-2 series PALs and fast discrete logic.

The Intercage Bus Arbiter determines the winner of the next intercage bus cycle among up to three bus requesters, consisting of two requests from each of the LPM cages and one from the Intracage Bus Interface. The arbitration algorithm employed for the intercage bus requesters in the presently preferred embodiment is a weighted priority. In this scheme, the relative priority of members is weighted and each member is assigned the highest priority for a percentage of the arbitration cycle, thereby guaranteeing highest priority during some percentage of total bus cycles and preventing bus lockout, for each member. It is not essential that the percentages of highest priority among the members be equal. The member with the greatest percentage of guaranteed bus cycles is deemed the highest priority member, and if that member does not request the bus, lower priority members may access it. Unlike the rotating scheme described above, the priority in the weighted scheme does not change in a circular manner; rather, the pattern of priority settings is contained in a programmable table. On each arbitration cycle, a different member is assigned the highest priority according to the selected settings in the alterable table. If no requests are present during that cycle, the priority changes to the next settings in the table In the preferred embodiment, the Intracage Bus Interface is given the highest priority for the intercage bus one-half of the time, and requests originating from each of the two LPM cages are given the highest priority one-quarter of the time for each cage. Thus, if the former requester is designated A and the latter two requesters are designated B and C, the weight assignments from highest to lowest priority may be in the order A-B-C in cycle 1, B-C-A in cycle 2, A-C-B in cycle 3, C-B-A in cycle 4, and repeating that sequence in the next four cycles, and so forth.

Three types of bus cycles—read, write, and read-/modify/write (RMW)—are provided to allow any card to access the memory on any other card in the system. All bus cycles are divided into two phases, consisting of the request phase and the response phase. The request phase is initiated by the master, whereas the response phase is commenced by the slave. Each phase uses the CBS for one clock cycle on each bus segment traversed.

The following protocol is employed for intracage bus data transfers. During the request phase of the read cycle, the master requests access to either bus A or B of the intracage bus to read data from the local memory of any slave on the CBS. Upon being granted access by the bus arbitrator, the master transmits the address of the location to be read on the address bus of the DTB. All slaves capture that information after one clock cycle to determine whether they must respond. The addressed slave uses the transmitted address to access the specified location, and, upon completion of the read access, requests use of the same DTB. When such use is granted, the slave transmits the read data and acknowledges the successful completion of the access, also placing applicable address information for the master and itself into the transmitted data. The master then recognizes its address, checks the tag field to verify that the data is being received from the correct slave, and captures the data on the bus.

When a master desires to write data into the local memory of a slave on the CBS, the master initiates a write cycle requesting access to bus A or B of the intracage bus. Upon being granted access by the ARB, the master transmits the address of the location into which the data is to be written on the address bus of the DTB. Here again, all slaves capture the information transmitted on the bus after one clock cycle, and determine from it whether they must respond to the bus cycle. The addressed slave uses the transmitted address to access the specified location, and when the write access is complete it will request use of the same DTB. Upon being granted use of the bus, the slave will acknowledge that the access was successfully completed. The slave places contents of the tag field identifying the master into address bits and its' cage and slot address into the tag field, so that the master can recognize its address, capture the data on the bus, and verify that the data was received from the correct slave.

The master initiates the RMW cycle to read and possibly modify the contents of a location on the SSU without allowing that location to be written to by another card. The RMW bus cycle consists of a read cycle, possibly followed by a write cycle at a later time depending on the software code executed. The master requests access to bus A or B of the intracage bus and the same initial procedure is followed as was indicated above for the write cycle, except that the master also asserts the RMW signal on the backplane, indicating to the SSU that this is a read/modify/write bus cycle. The read and write bus cycles are performed according to the above description, and, while the RMW signal is asserted, the location accessed by the master is locked to preclude any card other than the master that initiated the RMW cycle from writing to the locked location. If another card attempts to write to that location, the request is blocked and held in the queue on the SSU until the previous RMW cycle is completed. The deassertion of the RMW signal indicates completion of the RMW cycle.

Intercage bus transfers (in which master and slave cards are in different physical cages) are executed in very much the same manner as for intracage transfers, except that the ARB recognizes that the bus cycle is destined for another cage since the destination address does not match its own. Accordingly, the ARB acts as a slave, capturing and buffering the request on the bus, and then arbitrating for the intercage bus. When use of the bus is granted, the ARB transmits the request onto that bus using the tag field of the master. The ARB in the destination cage recognizes its address and captures and buffers the request from the bus. The destination cage ARB then acts as the master to request use of its intracage bus, transmit the proper slave address, receive an acknowledgment from the slave, capture and buffer the response, and re-arbitrate for the intercage bus. The response is transferred from the slave's cage ARB to the master's cage ARB and finally returned to the master. An analogous procedure to that described above for the intracage execution of bus transfers is followed for each of the read, write and RMW cycles in intercage bus transfers, except for this added role of the ARBs in the master's and slave's cages.

The address bus, function code bus, tag bus and data bus are parity protected, with each byte of the address bus and data bus having a parity bit, and the function code and tag buses having one parity bit each.

Error conditions may occur at any point during an information transfer. Also, an error such as an invalid address may be detected by the destination card. When an error is detected, a bus error indication is returned across each bus to the source card. The execution of each bus cycle is acknowledged either as successfully completed, by the assertion of an acknowledgment signal, or as unsuccessful access, by the assertion of bus error. Upon detection of an error condition on the DTB, the bus cycle is retried once on the same bus. If unsuccessful again, or if both buses are enabled and a retry is unsuccessful and the bus cycle is unsuccessful again when access is attempted on the other bus, the bus cycle is aborted and the processor enters bus error exception processing. If a retried bus cycle is successful, an interrupt is generated to the master.

The central bus system address map comprises a tag field which contains the source cage and slot address, a function code field which contains the Motorola MC68020 defined function code, the destination cage address, the slot address within the destination cage, and the destination local address (i.e., the location within the slave).

The PTB provides the physical and functional link between the LPM and up to four PCUs. It constitutes a demand assigned parallel bus providing a 32-bit data bus and a 25-bit address bus, each of which is parity protected. Data transfers may be 8 bits, 16 bits, 24 bits or 32 bits wide. The PTB supports cards operating as either master or slave or both. Here, also, the master initiates a bus cycle to access a slave, and a slave may only respond to bus cycles directed toward it. A module acting as both a master and a slave may initiate bus cycles and respond to bus cycles. When a request across the PTB is initiated and granted, the requester is considered to be the master and the requested resource is deemed to be the slave for that particular bus cycle. The LPM is granted to individual requesters in a round robin fashion, with each requester having equal priority. The aforementioned three bus cycles may also be executed on the PTB, and each is executed according to the MC68020 bus protocol.

The LPM may access all memory and registers contained on the PCUs via the PTB. An LPM transmits an address of a register or storage location on the PTB, and transfers read/write data to and from the addressed location as single data transfers either 8 or 16 bits wide After initialization is performed by the LPM and data becomes available, the controller requests bus control and performs the transfers over the PTB.

Figure 16:
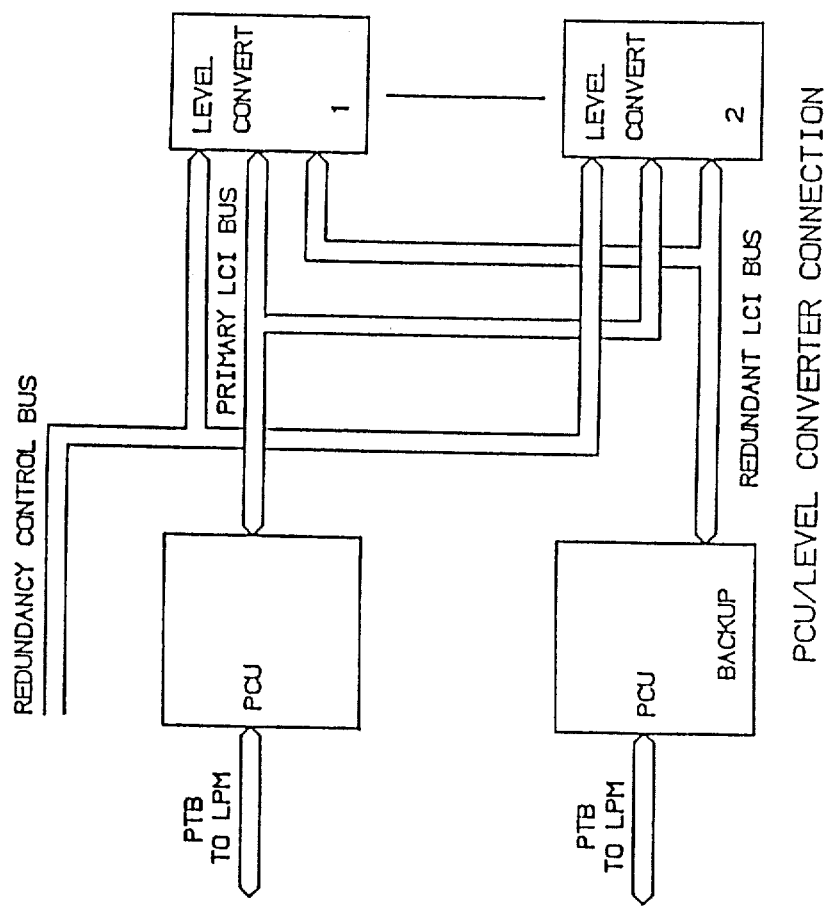
FIG. 16 is a detailed functional block diagram of a level converter/modem bus for the packet switching unit embodiment of FIG. 4.

The Level Converter/Modem interchange (LCM) bus is shown in greater detail in FIG. 16. This bus provides interconnection of PCUs with LCs. Each LC has independent interfaces to two LCM buses, one of which is the primary LCM bus that connects to an active PCU and the other of which is the redundant LCM bus which connects to a backup (standby) PCU. Such a configuration allows one-for-N redundancy for LPUs (i.e., LPM/PCU pairs). A Redundancy Control Bus (RCB) controls the selection of the primary or backup LCM bus for a selected LC group. The RCB provides a communication pathway in the TP4000/III packet switch between the SF and the TF. The RCB allows multiple CCE-Cage bus arbitrators (ARBs), acting as the RCB masters, to select as active either the primary or backup LCM bus between anV PCU and its associated LCM group RCB slaves. Communications are unidirectional from the ARB in the SF.

A write to the LCM redundancy control register on the ARB causes the data frame to be transmitted onto the RCB, with the most significant bit transmitted first. All LCs connected to the RCB receive the data, decode the address, and the selected LCs switch to the designated LCM bus accordingly. The RCB frame format is an 8-bit serial stream, with the first bit indicative of either primary or backup LCM bus, the second bit indicative of addressed mode, and the third through eighth bits indicative of the LPM identification.

Figure 17:
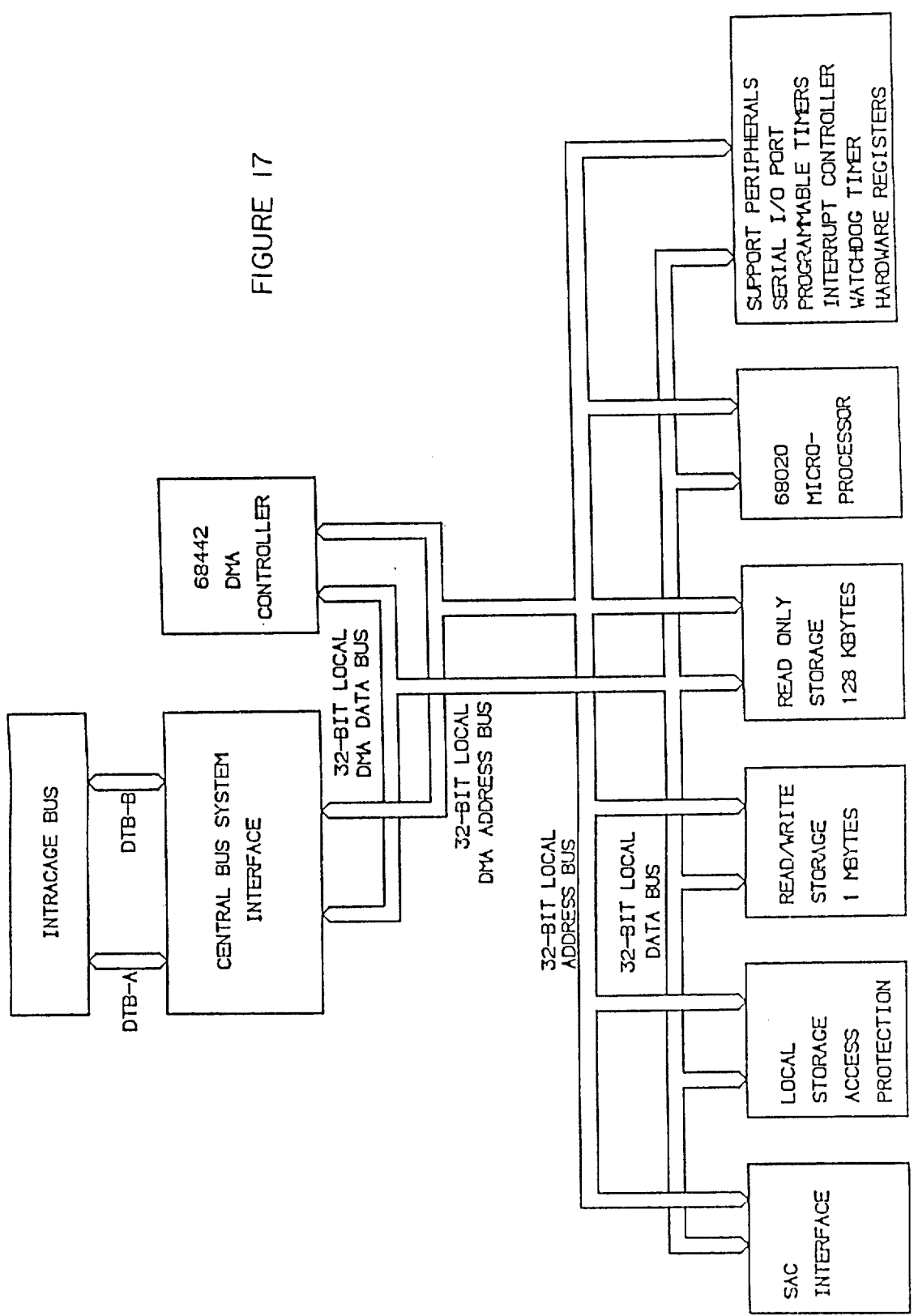
FIG. 17 is a detailed functional block diagram of a central processing unit for the packet switching unit embodiment of FIG. 4.

Referring now to FIG. 17, the Central Processing Unit (CPU), a high performance microprocessor-controlled computer at the heart of the Common Control Element CCE), resides in the SF and interfaces directly to the CBS. The CPU includes a Motorola MC68020 32-bit microprocessor operating at 12.5 MHz. Such a microprocessor supports fully vectored interrupt handling, multiple bus master arbitration and a dynamic bus sizing capability that allows the processor to communicate with external devices of various data bus widths. The MC68020 may address and access all local memory and all system memory via the resident CBS interface.

On board memory for the CPU includes one megabyte of parity protected random access memory (RAM) and 128 kilobytes of read only memory (ROM). The data bus for RAM is 32 bits wide, allowing 1, 2, 3 or 4 accesses in a single bus cycle. The entire RAM capacity is mapped into system memory so that it may be accessed from the CBS. Independent read and write protection is implemented on 4 kilobyte block boundaries within RAM for each MC68020 defined function code level. ROM is 16 bits wide, allowing byte or word accesses in a single bus cycle.

Support peripherals for the CPU include two MC68901 (Motorola) Multifunction Peripherals (MFPs), hardware registers, a watchdog timer and a local bus timer. One of the MFPs provides four programmable timers, an interrupt controller, an 8-bit parallel I/O port, and a serial I/O port which is a full duplex USART used as a diagnostic port that allows connection to a debug terminal from the front panel of the CPU. One of the programmable timers constitutes a baud rate generator for the serial I/O port. The parallel I/O port provides handshake signals for the serial I/O port. The other MFP provides a serial interface to the status, alarm and control (SAC) system master, allowing, among other things, the status information collected by the SAC system to be transferred to the CPU for further transfer to the NCC. The hardware registers include control, status, and error registers. The watchdog timer generates a reset or interrupt when processor inactivity is detected. The local bus timer generates a bus error exception to terminate a bus cycle when a device does not respond.

A Motorola MC68442 Direct Memory Access Controller (DMAC) provides high speed data block transfers with minimum intervention from the processor. The DMAC can act as bus master and thereby has access to all local and system memory; and, as implemented, it performs aligned long word block data transfers between the CBS and local RAM.

The CPU interfaces to the dual 32-bit Data Transfer Buses (DTBs) of the CBS, and operates as either a master or a slave on the CBS. When operating as a master, the microprocessor or DMAC resident in the CPU may initiate data transfers on the CBS. When operating as a slave, external cards may access local RAM.

Figure 18:
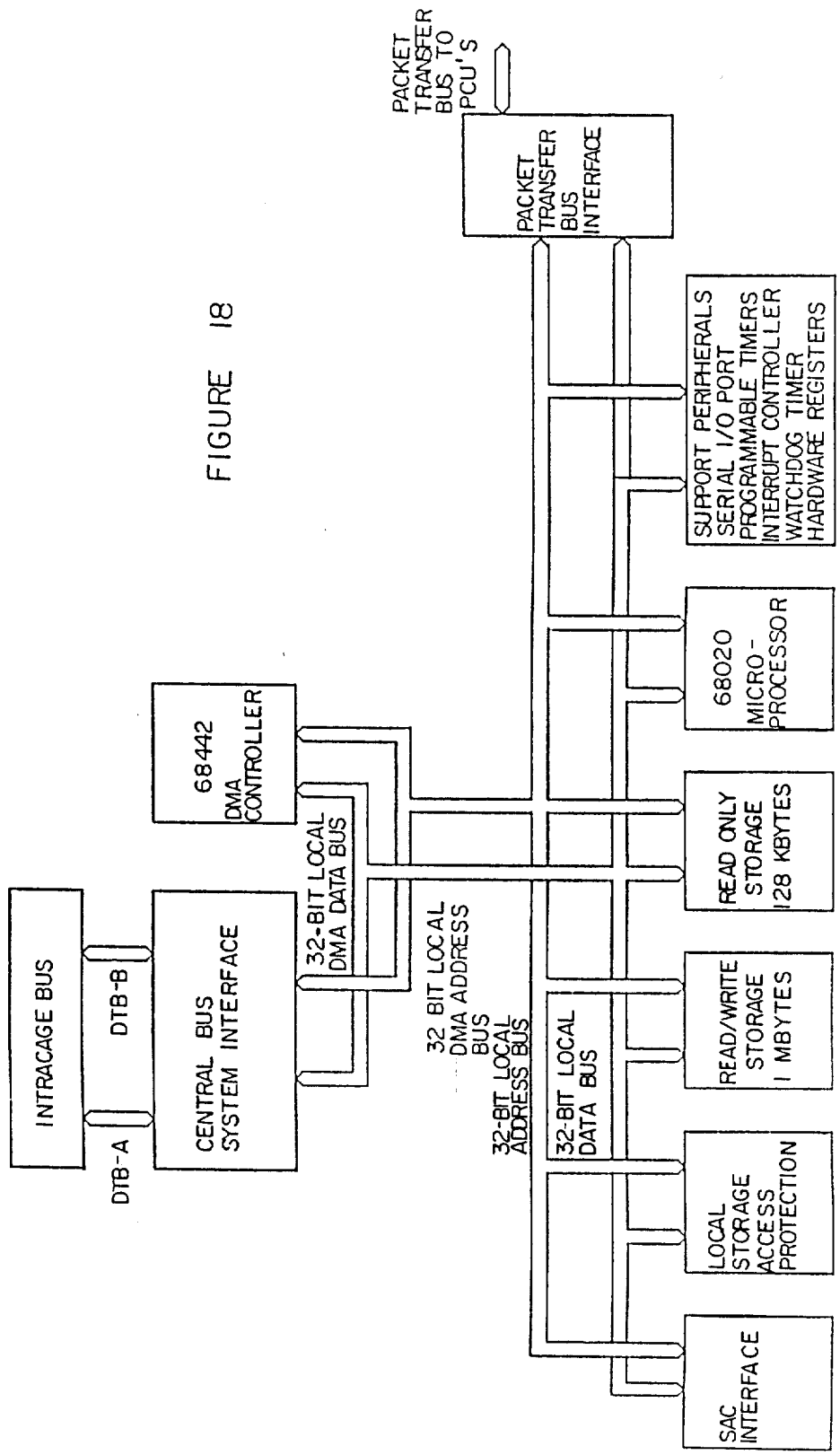
FIG. 18 is a more detailed functional block diagram of the line processing module for the packet switching unit embodiment of FIG. 4.

A functional block diagram of the Line Processing Module (LPM) of the TP4000/III packet switch embodiment of the present invention is shown in FIG 18. It will be observed that the LPM corresponds closely, both structurally and functionally, to the CPU. The LPM, like the CPU, is a high performance microprocessor-controlled computer, but it serves to interconnect the CBS to the PCUs housed in the TF. In that respect, the PTB provides the LPM to PCU connection. The LPM's primary function is to handle either link level processing or packet assembly and disassembly (PAD) for up to 128 ports (with a 4 PCU configuration). The major difference between the CPU and the LPM, aside from the aforementioned primary function, is the interconnection by the latter of the CBS to the PCUs via the PTB. Otherwise, the previous description of the CPU is analogous to the description of the LPM. The PTB interface connects to the 32-bit PTB data bus and the 25-bit PTB address bus, and provides arbitration for access to the PTB. Also, one-for-N redundancy is employed for the LPM paired with its associated PCUs. If a failure is detected on the LPM, the LPM and associated PCUs are thereupon switched off-line, and a redundant LPM and PCUs are switched on-line.

Figure 19:
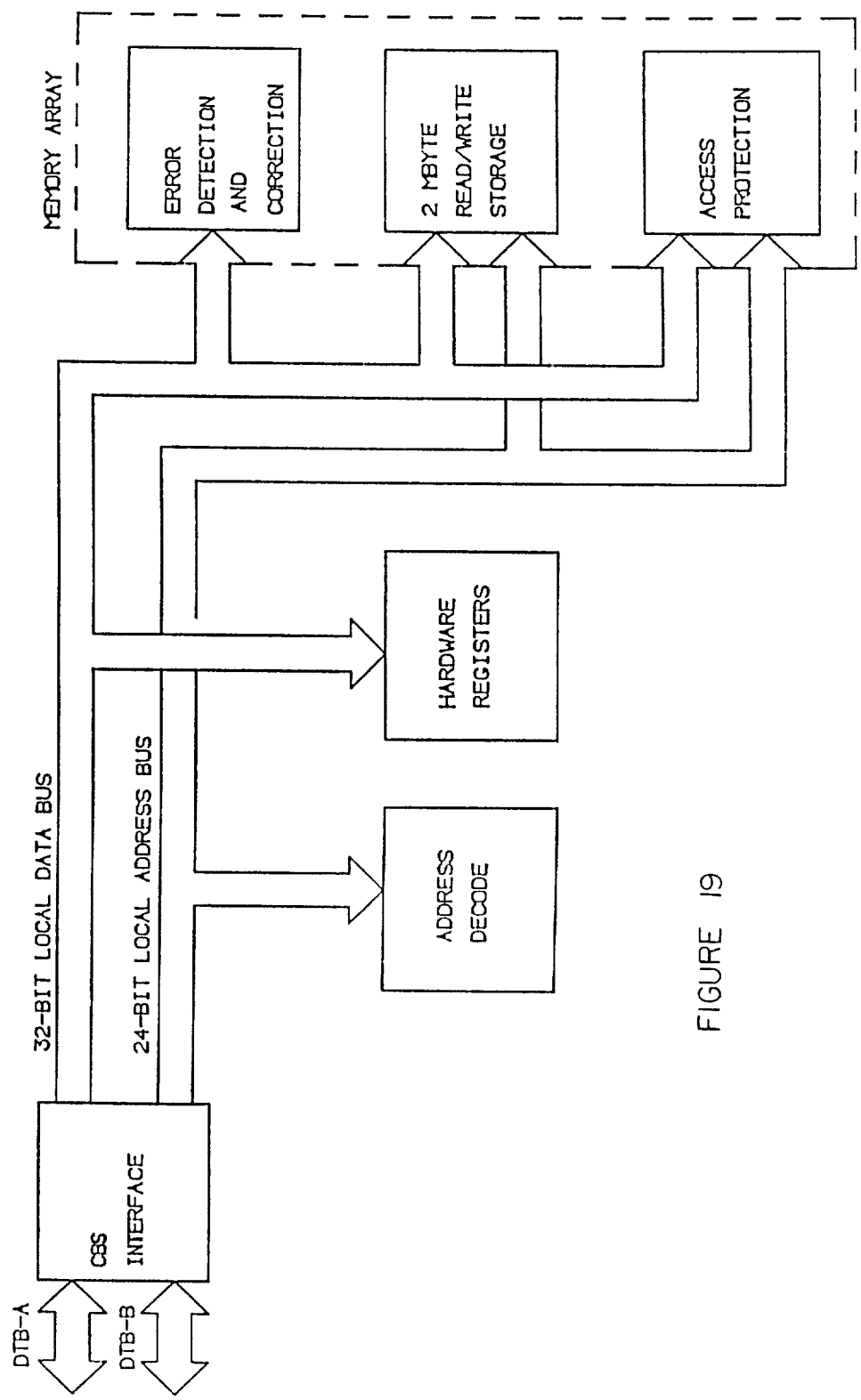
FIG. 19 is a more detailed functional block diagram of the shared storage unit for the packet switching unit embodiment of FIG. 4.

Referring now to FIG. 19, the Shared Storage Unit (SSU) comprises a RAM array, configured with either one or two megabytes of RAM, that provides a central storage area for data and control information within the Switch Facility. The RAM is 32 bits wide, allowing 1, 2, 3 or 4 byte accesses in a single CBS bus cycle. Accesses may be either aligned or misaligned. Error detection and correction protection is incorporated, with the capability to correct all single-bit errors and to detect all double-bit errors for each word of the RAM. Independent read and write (access) protection is implemented on 4 kilobyte block boundaries within RAM for each microprocessor (MC68020) defined function code level. Control, status, and error registers are included among several hardware registers in the SSU. A local bus timer generates a Bus Error Exception to terminate a bus cycle when a device does not respond.

The SSU interfaces to the dual 32-bit DTBs of the CBS. It operates as a slave on the CBS, allowing only external cards to access local memory and registers, and it supports read/modify/write bus operations from the CBS which are directed to its local RAM. When the SSU is operating in the virtual mode, the RAM array may be mapped anywhere within the system address space by programming the base address which is the cage and slot address virtual mode configuration register. Also, in that mode, SSUs may be cascaded to provide greater than two megabytes of contiguous system memory, subject to all cascaded SSUs residing in the same Switch Facility chassis. The cascading is accomplished by mapping local RAM to any 2 megabyte boundary within the 16 megabyte range that is accessible from the CBS.

The SSU supports both active and standby modes of operation. In the latter mode, an exact duplicate of the memory contents of the active SSU is contained in the standby SSU, by programming both the active and standby SSUs to operate in the virtual mode with the same system address. Write accesses update both the active and standby SSUs, but only the active SSU will respond to read accesses. Upon detection of a failure of the active SSU memory array, the standby SSU becomes active without requiring a reload.

Figure 20:
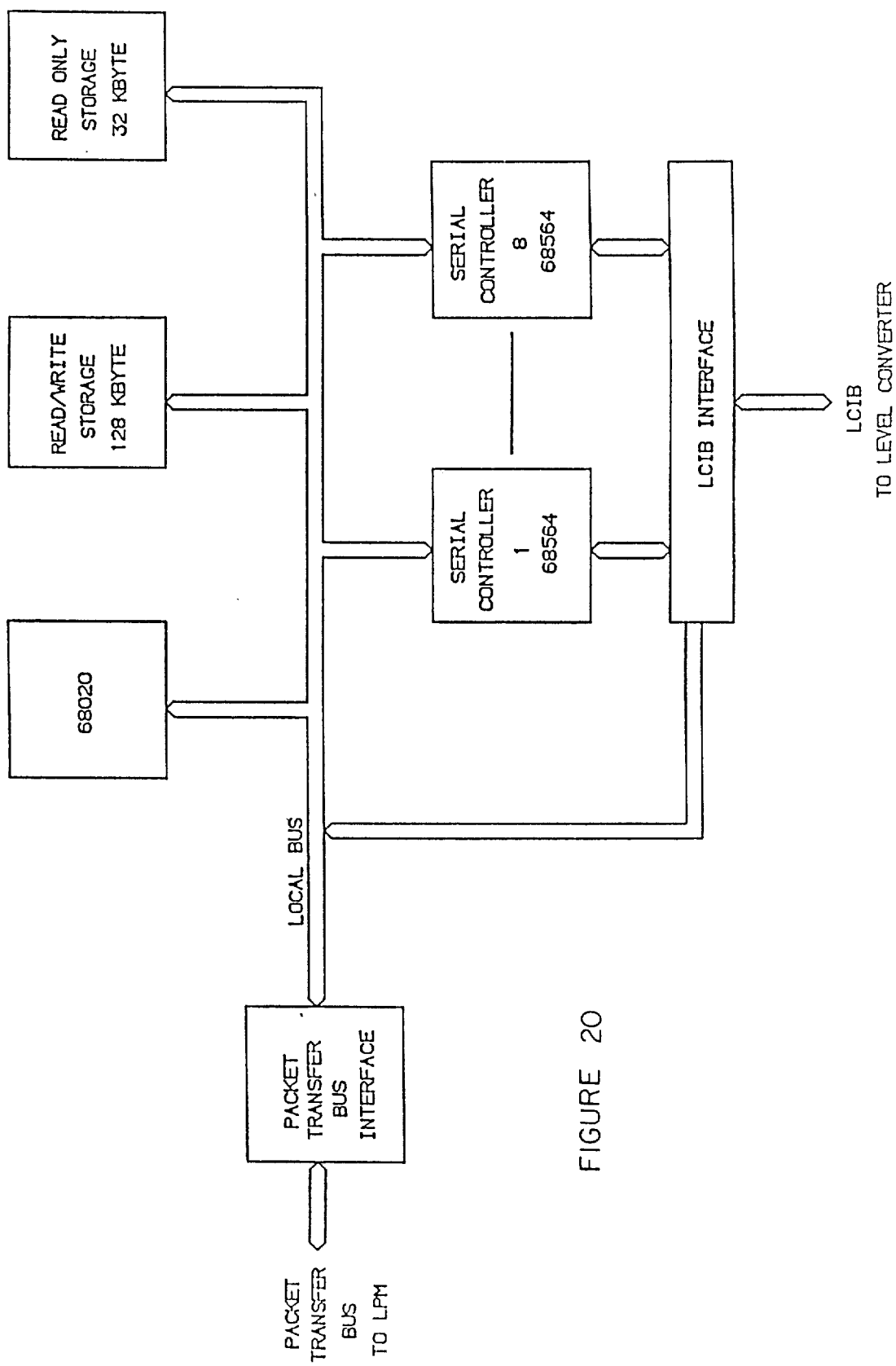
FIG. 20 is a detailed functional block diagram of a synchronous protocol control unit for the packet switching unit embodiment of FIG. 4.

A functional block diagram of a Synchronous Protocol Control Unit (SPCU) is illustrated in FIG. 20. The SPCU is a microprocessor-controlled serial port controller which operates under the direction of an external LPM to perform frame level protocol processing for up to sixteen resident serial ports. The SPCU supports a synchronous, bit-synchronous, and byte-synchronous communication, configurable on a port-by-port basis. Synchronous port speeds of 300 bps, 1200 bps, 2400 bps, 4800 bps, 9600 bps, 19.2 kbps, 48 kbps, 54.857 kbps, and 64 kbps are supported as well as a synchronous port speeds up to 19.2 kbps. To that end, the SPCU contains eight United Technologies MK68564 Serial I/O Controllers, each controller having two full duplex channels supporting a synchronous, bit-synchronous, and byte-synchronous communication.

The SPCU interfaces to the PTB to provide communication with an associated LPM, the PTB interface connecting to the 32-bit PTB data bus and the 25-bit PTB address bus. Arbitration for access to the PTB is provided by the PTB interface located on the LPM. Operation of the SPCU as either a master or a slave on the PTB is permitted. In the former mode, an MC 68020 microprocessor on the SpCU may initiate data transfers on the PTB, whereas in the slave mode, external cards may access local memory and registers. The microprocessor operates at 12.5 MHz to transfer data between the resident serial ports and the LPM local RAM via the PTB; and, as in other units mentioned above having such microprocessors, it supports fully vectored interrupt handling, multiple bus master arbitration and a dynamic bus sizing capability that allows the processor to communicate with external devices of various data bus widths.

On board (card) memory consists of 128 kilobytes of parity protected RAM and 16 kilobytes of ROM. The data bus width of RAM is 82-bits, allowing 1, 2, 3 or 4 byte accesses (which may be aligned or misaligned) in a single bus cycle. The entire RAM capacity is memory mapped into system memory, allowing it to be accessed from the PTB. ROM is organized as 8 bits.

The SPCU provides the physical and functional link between an associated LPM and two LCs, with data, clock, and modem interface signals for each of the up to 16 ports being bused between the SPCU and the two LCs via the LCM bus. Modem control signals for all ports are multiplexed onto the LCM bus and demultiplexed on the appropriate LC. Status signals are multiplexed on the LCs and demultiplexed on the SPCU. One-for-N redundancy is employed for the LPM paired with its associated PCUs, so that if a failure is detected on the SPCU the LPM and its associated PCUs will be switched off-line and a redundant LPM and PUs will be switched online.

Figure 21:
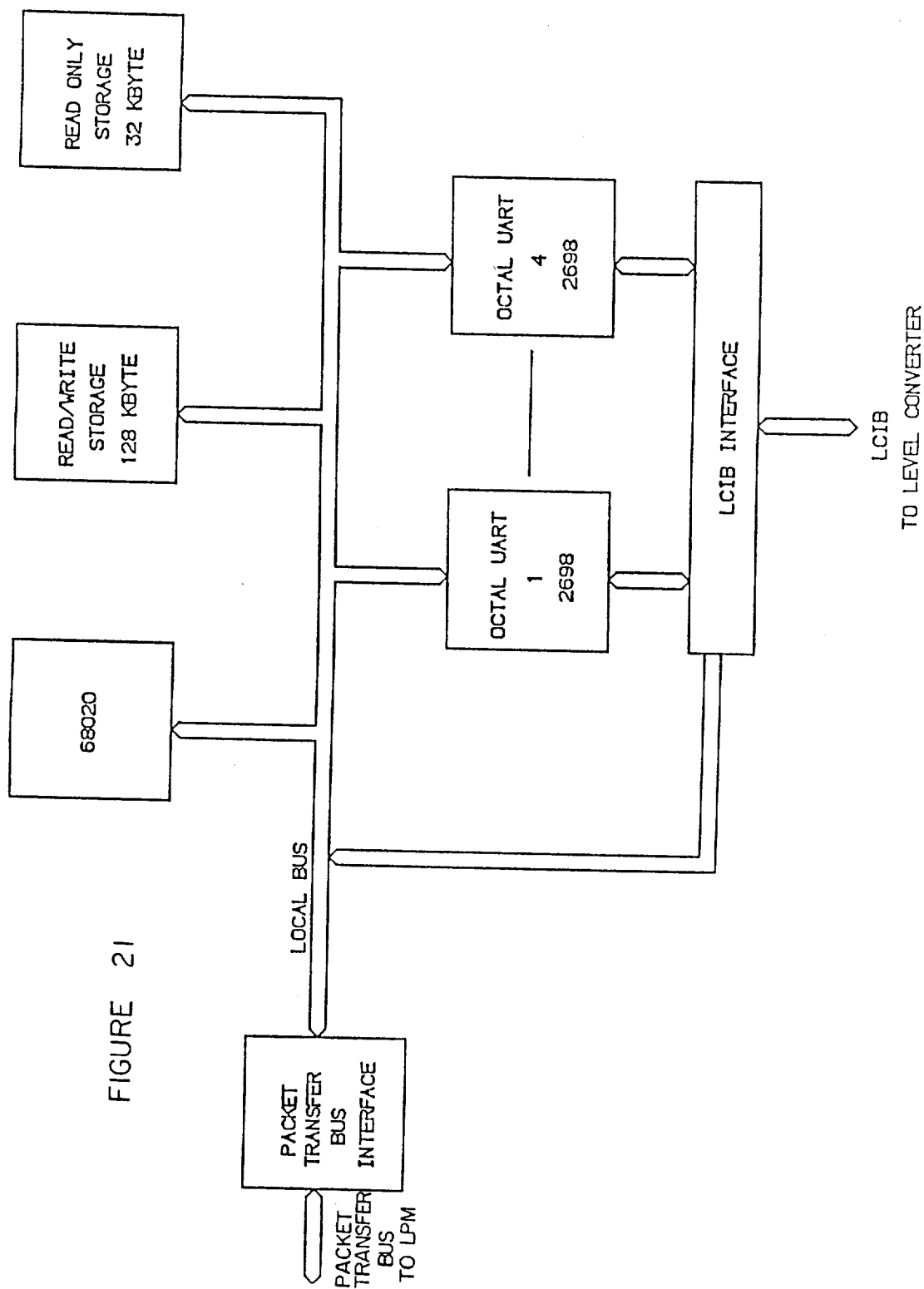
FIG. 21 is a detailed functional block diagram of an asynchronous protocol control unit for the packet switching unit embodiment of FIG. 4.

The Asynchronous Protocol Control Unit, shown in FIG. 21, corresponds closely to the SPCU, except that it performs PAD processing for up to 32 resident serial ports, supporting asynchronous port speeds of 150 bps, 300 bps, 1200 bps, 2400 bps, 4800 bps, 9600 bps, and 19.2 kbps configurable on port-to-port basis, and the APCU comprises four Signetics SCC2698 Octal Universal Asynchronous Receiver/Transmitter (Octal UART) units, each containing eight full duplex asynchronous channels. Otherwise, the foregoing description of the SPCU is applicable as well (with substitution of APCU for SPCU) to the APCU.

Figure 22:
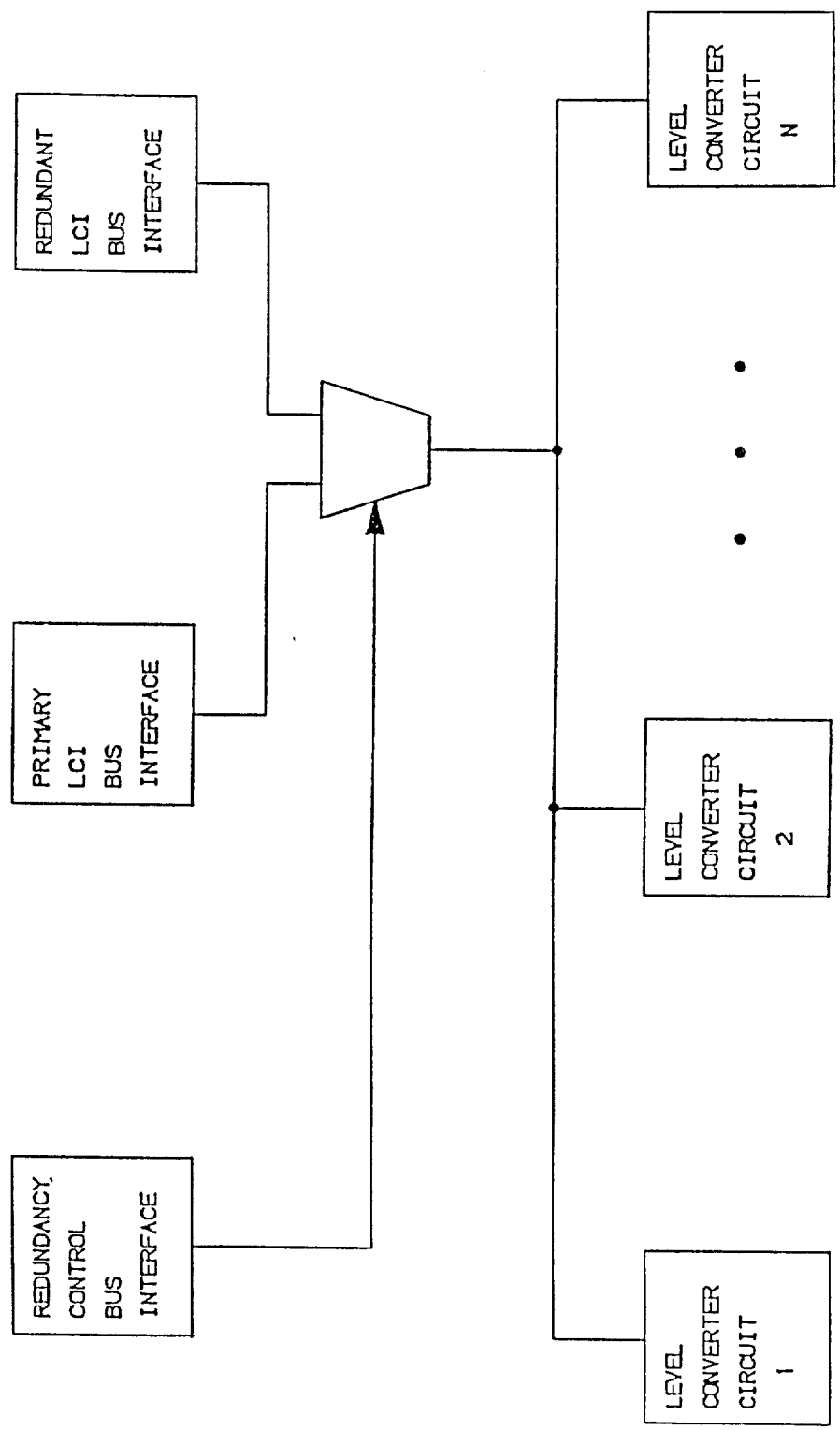
FIG. 22 is a block diagram of a level converter and bus interfacing configuration.

The RS-232 Synchronous Level Converter (RS-232 SLC), RS-232 Asynchronous Level Converter (RS-232 ALC), V.35 Synchronous ® Level Converter (V.35 SLC), and RS-449 Synchronous Level Converter (RS-449 SLC) all provide Level 1 interface to external equipment (DTE or DCE). Inasmuch as these level converters have many corresponding features and capabilities, the common aspects will be described first and then the differences between these units will be highlighted. Reference will be made back to FIG. 6 as well as to FIG. 22 showing a configuration of LCs together with LCM bus and RCB interfaces. Each LC interfaces to two LCM buses, only one of which (75) is active at any given time, allowing communication with an associated active and a standby PCU (SPCU for the synchronous LCs and APCU for the asynchronous LCs). Data, clock and modem interface signals for each of the ports of the LC are bused between the LC and the respective PCU via the LCM bus. Modem control signals for all ports are multiplexed by the PCU onto the LCM bus and demultiplexed on the associated LC. Status signals are multiplexed on the LCM bus by the LC and demultiplexed on the PCU. The determination of which LCM bus is active is controlled by the RCB, which interconnects all LCs in the TF and all ARBs in the SF. By programming the Redundancy Control Port on an active ARB, a command frame is broadcast to all LCs commanding a group of LCs associated with a particular PCU to select either the primary or the backup LCM bus.

The RS-232 SLC contains 8 ports with electrical interface compatible with EIA RS-232D for synchronous operation, and will also support asynchronous operation configurable on an individual port basis. The RS-232 ALC has 16 ports with the electrical interface compatible with EIA RS-232D for asynchronous operation. The V.35 SLC contains 8 ports with the electrical interface characteristics of the data and timing interchange circuits following the V.35 recommendation for synchronous operation. The RS-449 SLC contains 6 ports with the electrical interface characteristics of category 1 interchange circuits following the RS-449 recommendation for balanced signals, and with category 2 interchange circuits following the RS-232D specification. The RS-449 SLC will also support asynchronous operation configurable on an individual port basis.

Although a presently preferred embodiment of the present invention has been described herein, it will be apparent to those skilled in the field to which the invention pertains that variations and modifications of the preferred embodiment may be implemented without departing from the spirit and scope of the invention. For example, a hard disk may be interfaced to a packet switch according to the invention by use of a CPU card, to permit storage of, say, accounting data by a user on the user's site instead of requiring that such data be sent back to a network control center that dumps the data once per day. Accordingly, it is intended that the invention shall be limited onlY to the extent required by the appended claims under the applicable rules of law.

What is claimed is:

1. In a packet switch,
input means for receiving data from a source thereof,
a plurality of processing means for assembling the receive data into packets,
storage means for storing data packets,
bus means for permitting communication between each of said plurality of processing means and said storage means,
arbitration means for deciding which of said plurality of processing means shall be granted access to said bus means, said arbitration means including
programmable means for selectively and alterably designating any of at least two different levels of priority of access to said bus mans for each of said plurality of processing means whereby to assure greater access to said bus means by those of said plurality of processing means designated for the higher level of priority.

2. In the packet switch of claim 1,
said programmable mean being further adapted to designate the relative percentages of time that the said at least two priority levels of processing means shall be granted access to said bus means.

3. In the packet switch of claim 1, wherein
said bus means includes first and second bus means for said communication, and
said programmable means is further adapted to alternate requests for access between said first and second bus means.

4. In the packet switch of claim 1, wherein
said arbitration means further includes
means for selectively accessing the storage means via the bus means in any of a plurality of types of bus cycles including a read cycle, a write cycle and a read/modify/write cycle, each of said cycles having a request phase and a response phase.

5. In the packet switch of claim 1, wherein
said arbitration means further includes
means for selectively accessing the storage means via the bus means in any of a plurality of types of bus cycles including a read cycle, a write cycle and a read/modify/write cycle, each of said cycles having a request phase during which data is transferable from a said processing means to said storage means upon a grant of access and a response phase during which acknowledgment of a successful data transfer may be given by said storage means to which the data is transferred.

6. In the packet switch of claim 5, wherein
said arbitration means is adapted to grant access to a request received from a higher priority processing means within one bus cycle.

7. A communication processor for a packet-switched network, comprising:
means for distributing data to and from transmission links of said network,
plural means responsive to incoming data received by said distributing means from selected ones of said transmission links for assembly thereof into packets consisting of blocks of data,
means for storing assembled packets pending determination of further transmission thereof, and
means responsive to the degree of data traffic being handled by each of said assembly means for selectively and continuously establishing a greater or lesser degree of access thereby to said storage means according to said respective degree of data traffic.

8. The communication processor of claim 7, wherein
said access establishing means further establishes access for said storage means to acknowledge receipt of a packet from an assembly means.

9. The communication processor of claim 8, wherein the packet delivered by any of said assembly means upon access to said storage means includes address data identifying the location of the storage means to which the data packet is to be transferred and the location of the assembly means from which the packet was delivered.

10. The communication processor of claim 7, wherein said establishing means is programmable to establish access by each of said assembly means to said storage means by designating a desired level of priority for such access, including a percentage of any given interval of time for which access requested by an assembly means will be granted.

11. A communication processor for a packet-switched network, comprising means for distributing data to and from transmission links of said network, plural means responsive to incoming data received by said distributing means from selected ones of said transmission links for processing the data into a form suitable for internal handling and storage, means for storing the processed data pending retransmission thereof, means for selectively transferring data between said processing means and said storing means, and means responsive to the amount of data being handled by each of said processing means for selectively and continuously establishing a greater or lesser degree of access thereby to said transferring means for data transfer to said storage means and according to the relative activity of the respective processing means.

12. The communication processor of claim 11, wherein said access establishing means further establishes access to said transferring means for said storage means to acknowledge a successful data transfer from the respective processing means.

13. The communication processor of claim 11, wherein said establishing means is programmable to establish access by each of said processing means to said storage means by designating a desired level of priority for such access, including a percentage of any given interval of time for which access requested by a respective processing means will be granted.

14. In a packet switch for receiving data from a source thereof and subsequently re-transmitting the data toward the destination therefor, a plurality of processing means for processing the received data to convert it to a form suitable for internal handling, a plurality of handling means including means for storing the processed data, data transfer means for permitting communication between selected ones of said plurality of processing means and selected ones of said plurality of handling means, and communication granting means for selectively granting rights of communication to those among said plurality of processing means and said plurality of handling means requesting such right of communication for transfer of data via said data transfer means, said granting means including programmable means for selectively altering any of a plurality of levels of priority of communication via said data transfer means designated for said plurality of processing means and handling means, to provide higher priority of communication via said data transfer means to those among said plurality of processing means and said plurality of handling means requesting and having the greater need for data transfer.

15. In the packet switch of claim 14, said programmable means being further adapted to designate the relative percentages of time that the rights of communication shall be granted to said processing means and said handling means according to the designated levels of priority therefor.

16. In the packet switch of claim 14, said programmable means being further adapted to rotate the order of priority among said processing means and said handling means over a sequence of data transfer cycles of said data transfer mean equal in number to the number of participants for the right of communication among said processing means and said handling means.

17. In the packet switch of claim 14, wherein said data transfer means includes first and second transfer means for said communication, and said programmable means further adapted to alternate the grant of rights of communication between said first and second transfer means according to requests received and priority therefor.

18. In the packet switch of claim 14, wherein said granting means further includes means for selectively establishing communication between designated one of said processing means and said handling means via said data transfer means in any of a plurality of types of transfer cycles including a read cycle, a write cycle and a read/modify/write cycle, each of said cycles having a request phase during which data is transferable and a response phase during which acknowledgement of a successful data transfer may be given.

19. In the packet switch of claim 14, wherein is further included means for tagging the data to be transferred with address data identifying the source and destination thereof within the packet switch.

20. A packet-switched network including at least one packet switch for receiving and selectively re-transmitting data transmitted on said network, said packet switch including means for selectively delaying the retransmission of received data according to a predetermined but selectively alterable schedule in which selected packets are released for re-transmission ahead of other packets depending on routing of data traffic within the packet switch.

21. The packet switch of the network of claim 20, wherein said delaying means comprises input means for accepting the received data, a plurality of processing means for assembling the received data into packets, storage means for storing data packets, bus means for permitting communication between each of said plurality of processing means and said storage means, and arbitration means for deciding which of said plurality of processing means shall be granted access to said bus means, said arbitration means including means responsive to the extent of data traffic being handled by each of said processing means for selectively designating any of at least two different levels of priority of access to said bus means for each of said plurality of processing means according to said extent of data traffic whereby to assure greater access to said bus means by those of said plurality of processing means having the greater need.

22. The packet switch of claim 21, wherein said programmable means includes means to designate the relative percentages of time that the said at least two priority levels of processing means shall be granted access to said bus means.

23. The packet switch of claim 21, wherein said bus means includes first and second bus means for said communication, and said programmable means is adapted to alternate requests for access between said first and second bus means.

24. The packet switch of claim 21, wherein said arbitration means further includes means for selectively accessing the storage means via the bus means in any of a plurality of types of bus cycles including a read cycle, a write cycle and a read/modify/write cycle, each of said cycles having a request phase and a response phase.

25. The packet switch of claim 21, wherein said arbitration means further includes means for selectively accessing the storage means via the bus means in any of a plurality of types of bus cycles including a read cycle, a write cycle and a read/modify/write cycle, each of said cycles having a request phase during which data is transferable from a said processing mans to said storage means upon a grant of access and a response phase during which acknowledgement of a successful data transfer may be given by said storage means to which the data is transferred.

26. A communication processor for a packet-switched network, comprising means for distributing data to and from transmission links of said network;

at least one data communication bus means for transferring data internally of said processor in timed bus cycles;

plural means for processing incoming data received by said distributing means from selected ones of said transmission links;

plural means for storing data processed by said processing means;

plural means for retrieving data for transmission thereof via said distributing means to selected ones of said transmission links;

said at least one bus means interconnecting said plurality of processing means, storage means and retrieving means, whereby there is competition therebetween for data transfer via said at least one bus means during each of said bus cycles; and programmable means responsive to the degree of data traffic being handled by each of said processing means and said retrieving mean for selectively and continuously establishing a greater or lesser degree of access thereby to said bus means according to said respective degree of data traffic, whereby to alter access of said processing means, storage means and retrieving mean to said bus means during each bus cycle according to need for access.

27. The communication processor of claim 26, wherein said access altering means is programmed to rotate the order of priority for access to said bus means over successive bus cycles according to the number of contestants therefor, so that each contestant has the highest priority during a respective preselected bus cycle in the succession of bus cycles.

28. The communication processor of claim 26, wherein said access altering means is programmed to weight the order of priority for access to said bus means over successive bus cycles according to the perceived need for access, so that each contestant has the highest priority during a respective preselected percentage of sequence of bus cycles.

* * * * *

UNITED STATES PATENT AND TRADEMARK OFFICE
CERTIFICATE OF CORRECTION

PATENT NO. : 4,979,100
DATED : December 18, 1990
INVENTOR(S) : MAKRIS et al.

It is certified that error appears in the above-indentified patent and that said Letters Patent is hereby corrected as shown below:

On the title page, item
[75] Inventors:

This section should be deleted and amended as follows:

--PERRY W. MAKRIS; FAIRFAX, VIRGINIA; FREDERICK CHOI, HERNDON, VIRGINIA; MARK KLIMEK, CENTERVILLE, VIRGINIA; JAMES MAPP, HERNDON, VIRGINIA; KOJI MUNEMOTO, HERNDON, VIRGINIA; JEFF NICOLL, CHANTILLY, VIRGINIA; MARK SODERBERG, STERLING, VIRGINIA; JAMES A. MOORE, FAIRFAX, VIRGINIA; WILLIAM SWIFT, CUPERTINO, CALIFORNIA; SCOTT WALKER, FAIRFAX, VIRGINIA; WES BOSLOUGH, PHOENIX, ARIZONA; ERIC AMADOR, SAN CARLOS, CALIFORNIA; JOHN RAMSAY, HERNDON, VIRGINIA; SAMUEL J. COSTA, JR., HERNDON, VIRGINIA.--

Signed and Sealed this

Twenty-seventh Day of May, 1997

Attest:

BRUCE LEHMAN

Attesting Officer

Commissioner of Patents and Trademarks